(12) United States Patent
Takagi et al.

(10) Patent No.: US 8,982,420 B2
(45) Date of Patent: Mar. 17, 2015

(54) IMAGE PROCESSING METHOD, COMPUTER-READABLE STORAGE MEDIUM, AND INFORMATION PROCESSING APPARATUS FOR DETERMINING RENDERING INFORMATION BASED ON CALCULATED ERRORS BETWEEN IMAGES

(71) Applicants: Yasunobu Takagi, Kanagawa (JP); Toshihito Kamei, Tokyo (JP); Yoshiaki Hoshino, Kanagawa (JP); Taku Satoh, Kanagawa (JP)

(72) Inventors: Yasunobu Takagi, Kanagawa (JP); Toshihito Kamei, Tokyo (JP); Yoshiaki Hoshino, Kanagawa (JP); Taku Satoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/096,500

(22) Filed: Dec. 4, 2013

(65) Prior Publication Data
US 2014/0153056 A1 Jun. 5, 2014

(30) Foreign Application Priority Data
Dec. 5, 2012 (JP) .................................. 2012-266658

(51) Int. Cl.
*G06K 15/00* (2006.01)
*G06K 15/02* (2006.01)
*G06F 15/02* (2006.01)
*G06K 9/40* (2006.01)

(52) U.S. Cl.
CPC .......... *G06K 15/1881* (2013.01); *G06F 15/025* (2013.01)
USPC ........... 358/3.09; 358/3.11; 358/1.9; 382/254

(58) Field of Classification Search
None
See application file for complete search history.

(56) References Cited

U.S. PATENT DOCUMENTS

| | | | |
|---|---|---|---|
| 6,320,676 B1 * | 11/2001 | Yoshidome | 358/1.9 |
| 7,570,824 B2 * | 8/2009 | Katougi et al. | 382/239 |
| 2008/0292205 A1 * | 11/2008 | Naganuma | 382/269 |
| 2009/0225370 A1 * | 9/2009 | Gotoh et al. | 358/3.03 |
| 2013/0057879 A1 * | 3/2013 | Takagi et al. | 358/1.8 |

FOREIGN PATENT DOCUMENTS

| | | |
|---|---|---|
| JP | 4108517 | 4/2008 |
| JP | 2009-171014 | 7/2009 |

* cited by examiner

*Primary Examiner* — Steven Kau
(74) *Attorney, Agent, or Firm* — Oblon, McClelland, Maier & Neustadt, L.L.P.

(57) ABSTRACT

An image processing method includes dividing a first image into regions according to content of the first image; generating a second image by converting a gradation of pixels of the first image into a gradation of pixels expressible in an image forming apparatus for each region; generating a piece of simulation information of a result of the image forming/outputting process based on the second image and nozzle characteristic information of the image forming apparatus; calculating an error between the first image and a third image for each of the regions, the third image being obtained by converting the piece of simulation information with the gradation of pixels of the first image; and deciding one of the second images as rendering information used to cause the image forming apparatus to perform an image forming/outputting process, based on the calculated errors between the first image and the third images.

10 Claims, 22 Drawing Sheets

(a)

(b) PROCESS IN RASTER ORDER (c) START FROM UPPER LEFT (d) START FROM CENTER (e) BAYER FORM (1)

(f) BAYER FORM (2)

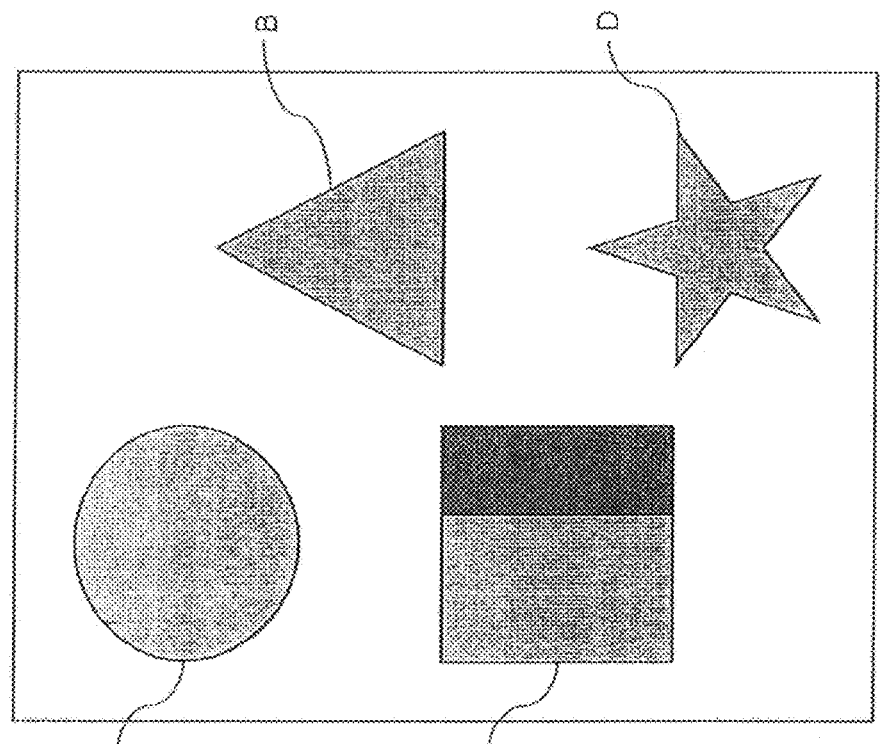
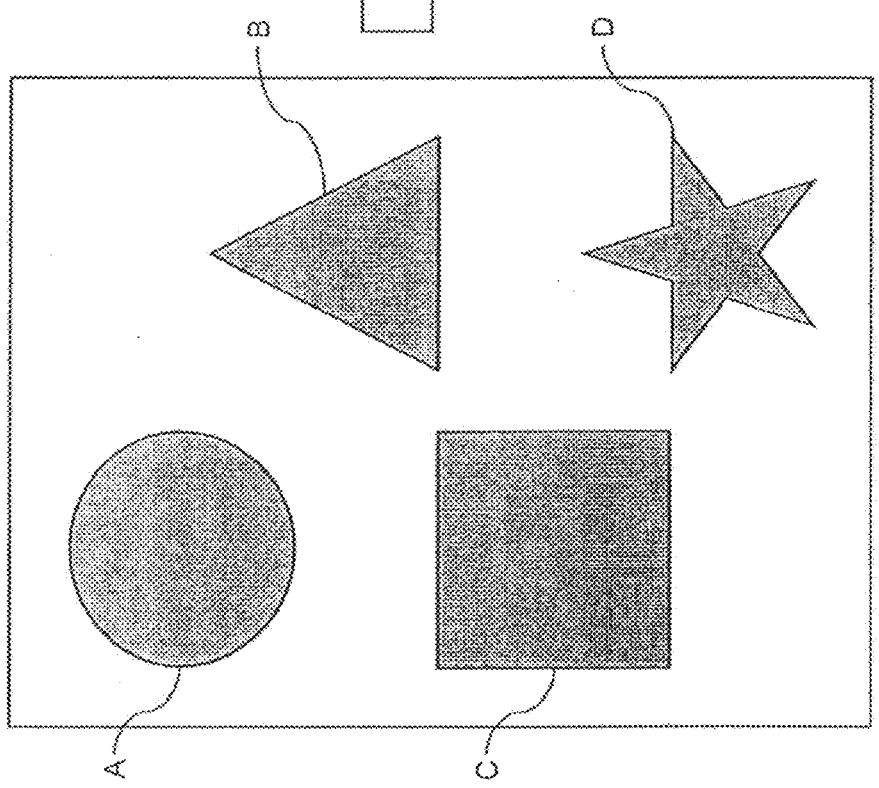
FIG.27

IMAGE PROCESSING METHOD, COMPUTER-READABLE STORAGE MEDIUM, AND INFORMATION PROCESSING APPARATUS FOR DETERMINING RENDERING INFORMATION BASED ON CALCULATED ERRORS BETWEEN IMAGES

CROSS-REFERENCE TO RELATED APPLICATION

The present application claims priority to and incorporates by reference the entire contents of Japanese Patent Application No. 2012-266658 filed in Japan on Dec. 5, 2012.

BACKGROUND OF THE INVENTION

1. Field of the Invention

The present invention relates to an image processing method, a computer-readable storage medium, and an information processing apparatus.

2. Description of the Related Art

In recent years, as information tends to be digitalized, image processing apparatuses such as printers or facsimiles used to output digitalized information or scanners used to digitalize documents have been essentials. The image processing apparatus usually has an imaging function, an image forming function, a communication function, and the like, and thus are configured as a multifunction machine which is usable as a printer, a facsimile, a scanner, and a copying machine.

Among such image processing apparatuses, a printer (hereinafter, referred to as an "ink jet printer") employing an ink jet scheme is known as an example of a printer used to output digitalized information. The ink jet printer includes a recording head with a nozzle ejecting ink, and performs image forming by applying pressure to an ink liquid chamber in the recording head through a PZT ($PbZrO_3$—$PbTiO_3$) element, a heater element, or the like and ejecting ink onto a sheet of paper which is a recording medium.

The ink jet printer performs image forming by ejecting ink in units of pixels forming an image of image data converted to a certain resolution based on the image data. Further, the ink jet printers are classified into a printer in which the density to express each pixel is a one gradation, that is, only chromatic and achromatic colors are distinguished and a printer in which three gradation expressions of dark, normal, and light are available according to its specification in addition to achromatic color.

On the other hand, in image data used for image forming/outputting, each of pixels configuring an image is configured to have more gradations than expressiveness of the density by the ink jet printer. For this reason, when image forming/outputting is performed by the ink jet printer, a half-toning process is performed by converting original image expressed by multiple gradations into gradations according to the expressiveness of the ink jet printer and preventing an image quality from deteriorating when viewed by people.

As examples of the half-toning process, a dithering technique and an error diffusion technique are known, and in recent years, a technique of directly obtaining and processing an error such as a direct binary search (DES) technique has been used as well (for example, see Japanese Laid-open Patent Publication No. 2009-171014).

In the ink jet printer, there is a problem in that a desired image is not formed due to a variation in characteristics (hereinafter, referred to as "landing characteristics") of ink which is ejected from the nozzle and fixed onto a sheet of paper. Examples of the landing characteristics include the size, the position, and the shape of ink ejected from the nozzle.

In recent years, for example, ink jet printers of a line type in which a plurality of heads is lined up and arranged in a longitudinal direction have been used. According to this type, it is possible to form an image of a wide range at a time, and thus it is possible to increase productivity by the ink jet printer.

However, in order to form an image of a wide range at a time, it is necessary to mount many nozzles, and the problem related to the landing characteristics of the nozzle is consequential as well. Particularly, since image forming/outputting are performed by single scanning, nozzles forming images of respective scanning lines are arranged at narrow intervals, and a variation in the landing characteristics between the nozzles has strong influence on the image quality.

Thus, in order to perform desired image forming/outputting using performance of an image forming/outputting engine, it is necessary to perform control according to characteristics of the image forming/outputting engine such as the landing characteristics of the nozzle.

Therefore, there is a need for image forming/outputting according to characteristics of the image forming/outputting engine without deteriorating the image quality.

SUMMARY OF THE INVENTION

It is an object of the present invention to at least partially solve the problems in the conventional technology.

According to an embodiment, there is provided an image processing method that includes acquiring a first image on which an image forming/outputting process is to be performed by an image forming apparatus; storing the first image in a storage medium; dividing the stored first image into a plurality of regions according to content of the first image; generating a second image with a converted gradation by converting a gradation of pixels of the stored first image into a gradation of pixels expressible in the image forming apparatus for each of the regions; generating a piece of simulation information of a result of the image forming/outputting process to be performed by the image forming apparatus based on the second image and nozzle characteristic information for each of the regions, the nozzle characteristic information being information representing characteristics of an ink ejecting nozzle of the image forming apparatus and being generated based on dot pattern image information that is information of an image obtained as a result of an image forming/outputting process that has been performed on a certain dot pattern; storing the piece of simulation information in the storage medium; calculating an error between the first image and a third image for each of the regions, the third image being obtained by converting the piece of simulation information with the gradation of pixels of the first image; storing the error in the storage medium; and deciding one of the second images as rendering information used to cause the image forming apparatus to perform an image forming/outputting process, based on the calculated errors between the first image and the third images obtained from the pieces of simulation information that are generated respectively based on the second images that are in different gradation conversion forms for the respective regions.

According to another embodiment, there is provided a non-transitory computer-readable storage medium with an executable program stored thereon. The program instructs a computer to perform: acquiring a first image on which an image forming/outputting process is to be performed by an image forming apparatus; storing the first image in a storage medium; dividing the stored first image into a plurality of regions according to content of the first image; generating a second image with a converted gradation by converting a gradation of pixels of the stored first image into a gradation of pixels expressible in the image forming apparatus for each of the regions; generating a piece of simulation information of a result of the image forming/outputting process to be performed by the image forming apparatus based on the second image and nozzle characteristic information for each of the regions, the nozzle characteristic information being information representing characteristics of an ink ejecting nozzle of the image forming apparatus and being generated based on dot pattern image information that is information of an image obtained as a result of an image forming/outputting process that has been performed on a certain dot pattern; storing the piece of simulation information in the storage medium; calculating an error between the first image and a third image for each of the regions, the third image being obtained by converting the piece of simulation information with the gradation of pixels of the first image; storing the error in the storage medium; and deciding one of the second images as rendering information used to cause the image forming apparatus to perform an image forming/outputting process, based on the calculated errors between the first image and the third images obtained from the pieces of simulation information that are generated respectively based on the second images that are in different gradation conversion forms for the respective regions.

According to still another embodiment, there is provided an image processing apparatus that includes an image acquiring unit configured to acquire a first image on which an image forming/outputting process is to be performed by an image forming apparatus, and store the first image in a storage medium; an output image dividing unit configured to divide the stored first image into a plurality of regions according to content of the first image; a gradation converting unit configured to generate a second image with a converted gradation by converting a gradation of pixels of the stored first image into a gradation of pixels expressible in the image forming apparatus for each of the regions; an output result simulating unit configured to generate a piece of simulation information of a result of the image forming/outputting process to be performed by the image forming apparatus based on the second image and nozzle characteristic information for each of the regions, the nozzle characteristic information being information representing characteristics of an ink ejecting nozzle of the image forming apparatus and being generated based on dot pattern image information that is information of an image obtained as a result of an image forming/outputting process that has been performed on a certain dot pattern, and store the piece of simulation information in the storage medium; a simulation error calculating unit configured to calculate an error between the first image and a third image for each of the regions, the third image being obtained by converting the piece of simulation information with the gradation of pixels of the first image, and store the error in the storage medium; and a rendering information deciding unit configured to decide one of the second images as rendering information used to cause the image forming apparatus to perform an image forming/outputting process, based on the calculated errors between the first image and the third images obtained from the pieces of simulation information that are generated respectively based on the second images that are in different gradation conversion forms for the respective regions.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 27 is a diagram illustrating images before and after a half-toning process is performed according to an embodiment of the present invention;

FIG. 28 illustrates examples of dividing an object according to an embodiment of the present invention;

FIG. 29 illustrates examples of dividing an object according to an embodiment of the present invention;

DETAILED DESCRIPTION OF THE PREFERRED EMBODIMENTS

First Embodiment

Hereinafter, an exemplary embodiment of the present invention will be described in detail with reference to the drawings. In the embodiment, a technique will be described in which in image forming/outputting using an image forming apparatus employing an ink jet type, image forming/outputting is performed according to characteristics of an image forming/outputting engine by performing a special process in a printer driver installed in the information processing apparatus in order to cause an image forming apparatus to perform image forming/outputting.

Figure 1:
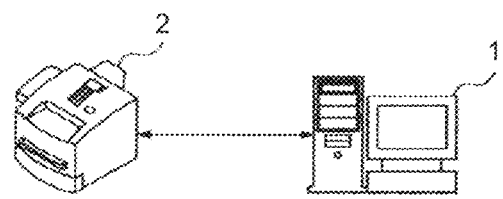
FIG. 1 is a diagram illustrating an operation form of an information processing apparatus and an image forming apparatus according to an embodiment of the present invention.

FIG. 1 is a diagram illustrating an operation form of an information processing apparatus 1 and an image forming apparatus 2 according to the present embodiment. The information processing apparatus 1 and the image forming apparatus 2 according to the present embodiment are connected via a network and operated as illustrated in FIG. 1. As concrete examples of the information processing apparatus 1 and the image forming apparatus 2, in addition to a case in which the information processing apparatus 1 is a common information processing terminal such as a personal computer (PC), and the image forming apparatus 2 is an ink jet printer used at home or the like, for example, there is a case in which the image forming apparatus 2 is a printing machine used for commercial printing, and the information processing apparatus 1 is an information processing terminal for controlling used to control a commercial printing machine.

The information processing apparatus 1 is a general-purpose information processing apparatus such as a PC. A software program configuring a printer driver for implementing a function of causing the image forming apparatus 2 to perform image forming/outputting is installed in the information processing apparatus 1. The function implemented by the printer driver is the gist of the present embodiment.

Figure 2:
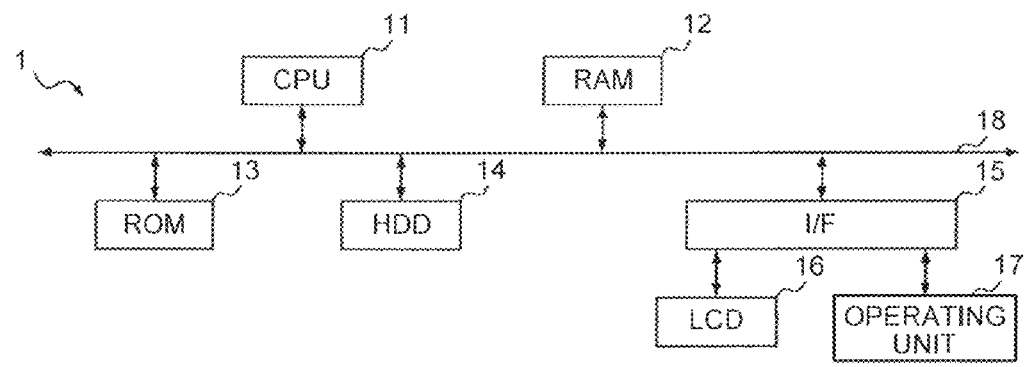
FIG. 2 is a diagram illustrating a hardware configuration of an information processing apparatus according to an embodiment of the present invention.

A hardware configuration of the information processing apparatus 1 according to the present embodiment will be described with reference to FIG. 2. The information processing apparatus 1 according to the present embodiment has a configuration similarly to a configuration employed in a common server, a PC, or the like as illustrated in FIG. 2. In other words, the information processing apparatus 1 according to the present embodiment is configured such that a central processing unit (CPU) 11, a random access memory (RAM) 12, a read only memory (ROM) 13, a hard disk drive (HDD) 14, and an interface (I/F) 15 are connected via a bus 18. Further, a liquid crystal display (LCD) 16 and an operating unit 17 are connected to the I/F 15.

The CPU 11 is an operation device, and controls an operation of the information processing apparatus 1 in general. The RAM 12 is a volatile storage medium in which information can be read and written at a high speed, and is used as a work area when the CPU 11 processes information. The ROM 13 is a non-volatile read only storage medium and stores a program such as firmware. The HDD 14 is a non-volatile storage medium in which information can be read and written, and stores an operating system (OS), various kinds of control programs, application programs. The software program configuring the printer driver is stored in the HDD 14 as well.

The I/F 15 connects the bus 18 with various kinds of hardware, a network, or the like and performs controls. The LCD 16 is a visual user interface through which the user checks a status of the information processing apparatus 1. The operating unit 17 is a user interface through which the user inputs information to the information processing apparatus 1 such as a keyboard or a mouse.

In this hardware configuration, a software control unit is configured such that a program stored in the ROM 13, the HDD 14, or a storage medium such as an optical disk (not illustrated) is read out to the RAM 12 and the CPU 11 performs an operation according to the program. The function of the information processing apparatus 1 according to the present embodiment is implemented by a combination of the software control unit configured as described above and hardware.

Figure 3:
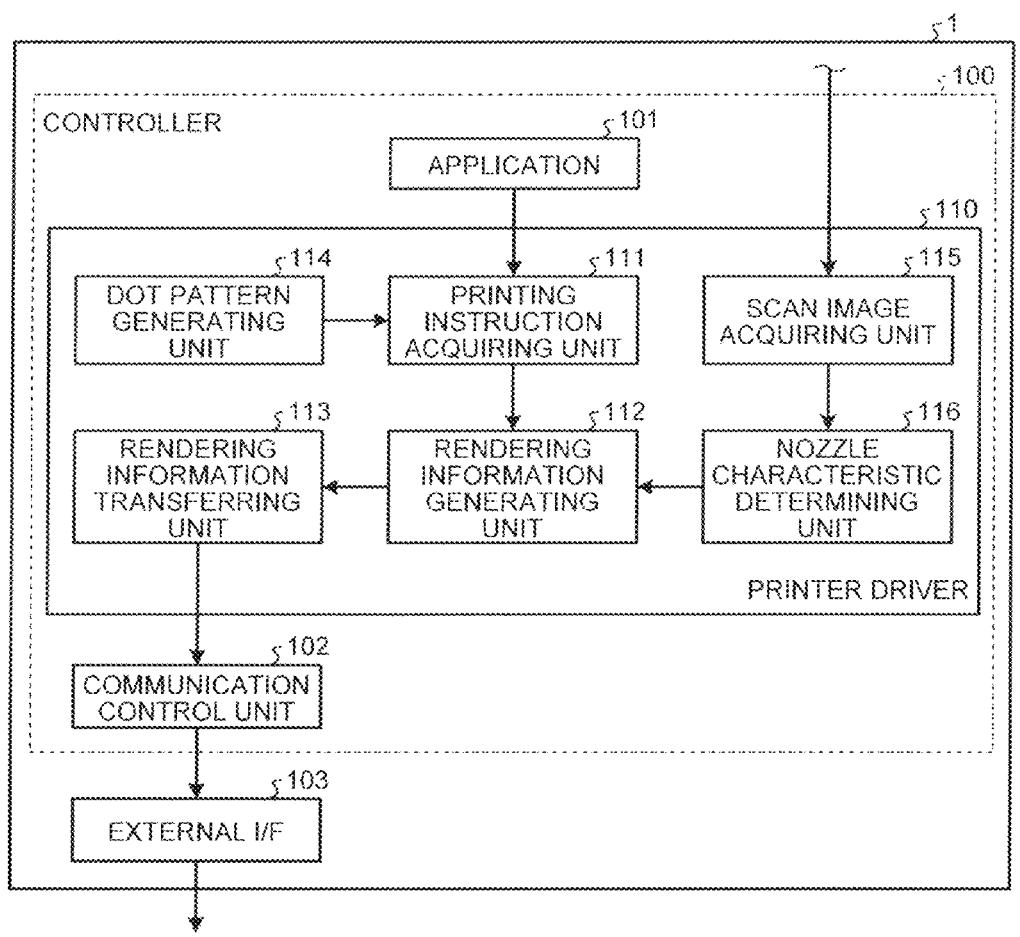
FIG. 3 is a diagram illustrating a functional configuration of an information processing apparatus according to an embodiment of the present invention.

Next, a functional configuration of the information processing apparatus 1 according to the present embodiment will be described. The information processing apparatus 1 according to the present embodiment includes a controller 100 and an external I/F 103 as illustrated in FIG. 3. The external I/F 103 is an interface through which the information processing apparatus 1 exchanges information with the image forming apparatus 2, and the Ethernet (a registered trademark) or a universal serial bus (USB) interface is used.

The controller 100 is the software control unit configured as described above, and includes an application 101, a communication control unit 102, and a printer driver 110. The application 101 is software that implements a function of browsing or editing image data, document data, or the like.

The application 101 outputs a printing instruction of image data, document data, or the like which is being browsed or edited according to the user's operation. The communication control unit 102 enables the controller 100 to perform a process of exchanging information with the image forming apparatus 2 through the external I/F 103.

The printer driver 110 is an element related to the gist of the present embodiment, receives the printing instruction from the application 101, and generates rendering information which is information used when the image forming apparatus 2 performs image forming/outputting. At this time, the printer driver 110 generates the rendering information according to characteristics of an image forming mechanism equipped in the image forming apparatus 2 so that a desired high-accuracy image can be formed. This process relates to the gist of the present embodiment.

The printer driver 110 according to the present embodiment includes a printing instruction acquiring unit 111, a rendering information generating unit 112, a rendering information transferring unit 113, a dot pattern generating unit 114, a scan image acquiring unit 115, and nozzle characteristic determining unit 116 as illustrated in FIG. 3. The function of the printer driver 110 will be described later.

The image forming apparatus 2 includes an image forming mechanism of an ink jet type, and performs image forming/outputting according to the rendering information input from the information processing apparatus 1. A functional configuration of the image forming apparatus 2 according to the present embodiment will be described with reference to FIG. 4. The image forming apparatus 2 according to the present embodiment includes a controller 200, an operation panel 30, a carriage 21, a main scanning motor 24, a sub scanning motor 26, a conveying belt 27, and a charging roller 29 as illustrated in FIG. 4.

The operation panel 30 is a user interface serving as an operating unit and a display unit through which necessary information are input to and displayed on the image forming apparatus 2. The carriage 21 includes a recording head 23 ejecting ink and a head driver 22 driving the recording head 23, and is driven in a main-scanning direction which is a direction perpendicular to a sub-scanning direction which is a conveying direction of a paper, ejects ink onto the front surface of the paper conveyed by the conveying belt 27, and performs image forming/outputting.

The main scanning motor 24 is a motor supplying power for operating the carriage 21 in the main-scanning direction. The sub scanning motor 26 is a motor supplying power to the conveying belt 27 that conveys a paper of an image output target. Rotation of the main scanning motor 24 and rotation of the sub scanning motor 26 are detected by an encoder sensor 25 and an encoder sensor 28, respectively, and detection signals are input to the controller 200. The charging roller 29 electrically charges the conveying belt 27, and generates an electrostatic force causing a paper of an image output target to be absorbed onto the conveying belt 27.

Figure 4:
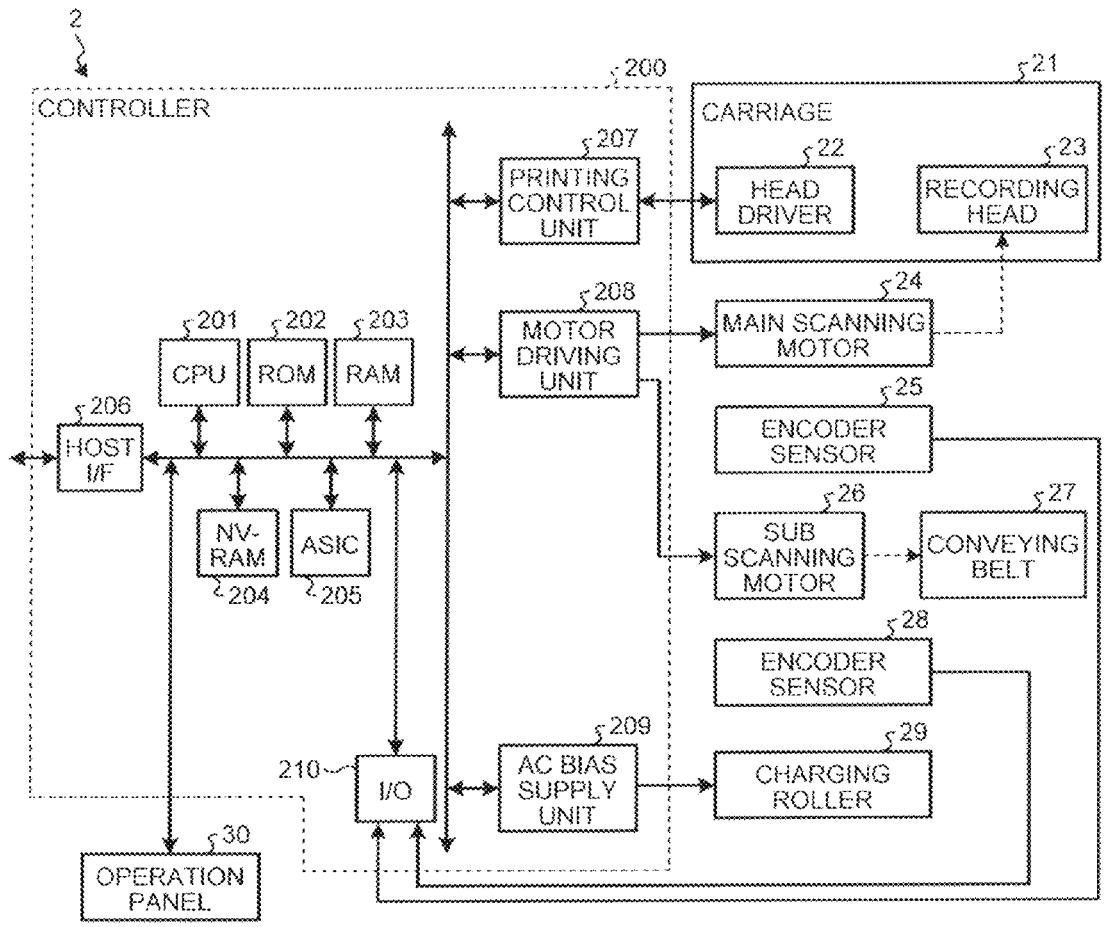
FIG. 4 is a diagram illustrating a functional configuration of an image forming apparatus according to an embodiment of the present invention.

The controller 200 is a control unit that controls an operation of the image forming apparatus 2, and includes a central processing unit (CPU) 201, a read only memory (ROM) 202, a random access memory (RAM) 203, a non-volatile RAM (NVRAM) 204, an application specific integrated circuit (ASIC) 205, a host I/F 206, a printing control unit 207, a motor driving unit 208, an AC bias supply unit 209, and an I/O 210 as illustrated in FIG. 4.

The CPU 201 is an operation device, and controls operations of respective elements of the controller 200. The ROM 202 is a non-volatile read only storage medium, and stores a program such as firmware. The RAM 203 is a volatile storage medium in which information can be read and written at a high speed, and is used as a work area when the CPU 201 processes information. The NVRAM 204 is a non-volatile storage medium in which information can be read and written, and stores control programs or control parameters.

The ASIC 205 is a hardware circuit that performs image processing necessary for image forming/outputting. The host I/F 206 is an interface through which rendering data is received from the information processing apparatus 1, and the Ethernet (a registered trademark) or a universal serial bus (USB) interface is used. The I/O 210 is a port through which detection signals from various kinds of sensors such as the encoder sensors 25 and 28 are input to the controller 200.

The printing control unit 207 includes a data transferring unit that drives and controls the recording head 23 of the carriage 21 and a driving waveform generating unit that generates a driving waveform. The motor driving unit 208 drives the main scanning motor 24 and the sub scanning motor 26. The AC bias supply unit 209 supplies the charging roller 29 with an AC bias.

The rendering data input from the information processing apparatus 1 is input to the host I/F 206 in the controller 200 as described above and then stored in a receiving buffer in the host I/F. The CPU 201 performs an operation according to a program loaded into the RAM 203, reads and analyzes the rendering data in the receiving buffer of the host I/F 206, and controls the ASIC 205 such that necessary image processing, a data sorting process, or the like is performed. Hereinafter, the CPU 201 controls the printing control unit 207 such that the rendering data processed in the ASIC 205 is transferred to the head driver 22.

The printing control unit 207 transfers the rendering data to the head driver 22 in the form of serial data, and outputs a transfer clock, a latch signal, a droplet control signal (a mask signal), or the like necessary for transferring the rendering data, transfer check, or the like to the head driver 22. Further, the printing control unit 207 includes a driving waveform selecting unit that applies pattern data of a driving signal stored in the ROM 202 to a driving waveform generating unit configured with a D/A converter performing digital to analog (D/A) conversion, a voltage amplifier, and a current amplifier and the head driver 22, generates a driving waveform configured with a single driving pulse (driving signal) or a plurality of driving pulses (driving signals), and outputs the driving waveform to the head driver 22.

The head driver 22 drives the recording head 23 by selectively applying the driving signal configuring the driving waveform applied from the printing control unit 207 to an driving element generating energy causing liquid droplet ejected from the recording head 23 based on a row of serially input rendering data. At this time, the head driver 22 can select the driving pulse configuring the driving waveform and hit dots of different sizes such as a large droplet (a large dot), a medium droplet (a medium dot), and a small droplet (a small dot).

Further, the CPU 201 calculates a driving output value (control value) for the main scanning motor 24 based on a speed detection value and a position detection value obtained by sampling a detection pulse received from the encoder sensor 25 configuring a linear encoder and a speed target value and a position target value obtained from a previously stored speed and position profiles, and drives the main scanning motor 24 through the motor driving unit 208. Similarly, the CPU 201 calculates a driving output value (control value) for the sub scanning motor 26 based on a speed detection value and a position detection value obtained by sampling a detection pulse received from the encoder sensor 28 configuring a rotary encoder and a speed target value and a position target value obtained from a previously stored speed and position profiles, and drives the sub scanning motor 26 through the motor driving unit 208.

Figure 5:
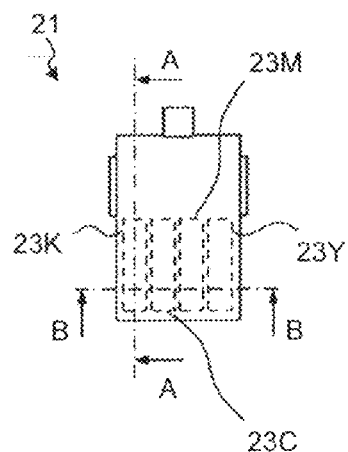
FIG. 5 is a diagram schematically illustrating a recording head according to an embodiment of the present invention.

Here, a configuration of the recording head 23 of the carriage 21 will be described. FIG. 5 is a diagram schematically illustrating a configuration of the recording head 23 of the carriage 21 according to the present embodiment. The carriage 21 according to the present embodiment includes recording heads 23K, 23C, 23M, and 23Y for respective colors of CMYK (Cyan, Magenta, Yellow, black) as the recording head 23 as illustrated in FIG. 5.

Figure 6A:
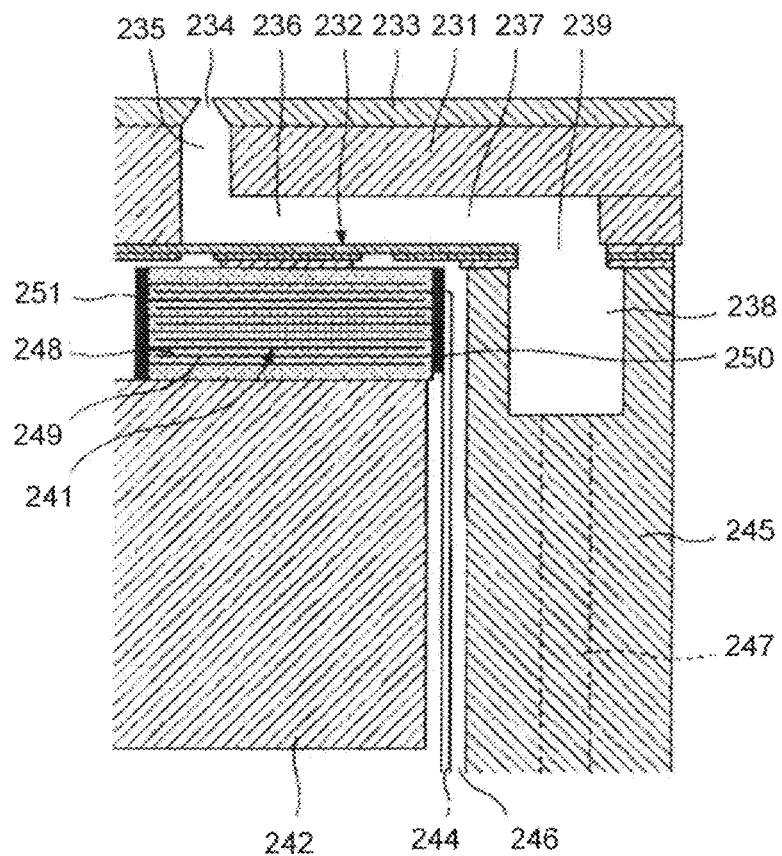
FIGS. 6A and 6B are cross-sectional views illustrating a recording head according to an embodiment of the present invention.
Figure 6B:
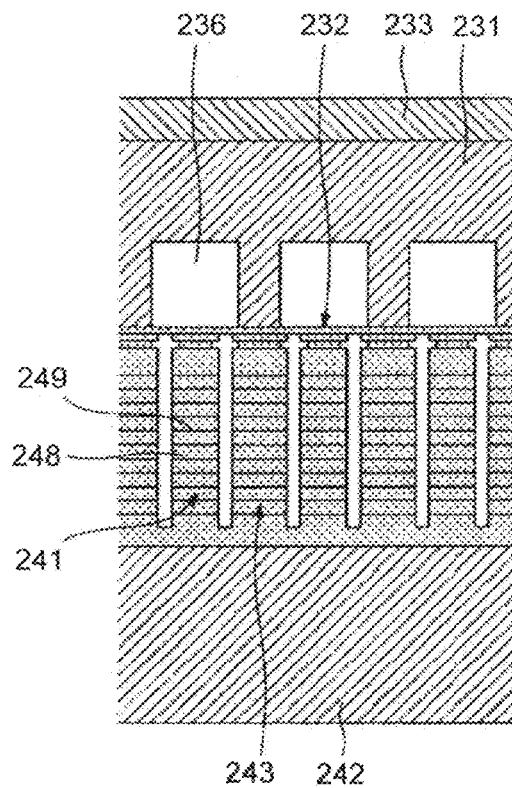

FIG. 6A is a cross-sectional view take along line A-A of FIG. 5, and FIG. 6B is a cross-sectional view take along line B-B of FIG. 5. In the recording head 23 according to the present embodiment, as illustrated in FIGS. 6A and 6B, for example, a channel plate 231 formed by anisotropically etching a single crystalline silicon substrate, a vibrating plate 232 which is bonded to the bottom surface of the channel plate 231 and formed, for example, by nickel electroforming, and a nozzle plate 233 which is bonded to the top surface of the channel plate 231 are bonded and stacked so as to form a nozzle communication path 235 serving as a channel communicating with a nozzle 234 ejecting a liquid droplet (ink droplet), a liquid chamber 236 serving as a pressure generating chamber, and an ink supply port 239 that supplies ink to the liquid chamber 236 through a fluid resistive portion (supply path) 237 and communicates with a common liquid chamber 238, and the like.

Further, a stack-type piezoelectric elements 241 of two columns serving as an electromechanical transduction element which is a pressure generating unit (an actuator unit) for deforming the vibrating plate 232 and pressurizing ink in the liquid chamber 236 and a base substrate 242 that bonds with and fixes the piezoelectric element 241 are disposed. Further, a support portion 243 is interposed between the piezoelectric elements 241. The support portion 243 is formed at the same time as the piezoelectric element 241 by dividing and processing a piezoelectric element member, but is just a support because a driving voltage is not applied.

Further, a FPC cable 244 in which a driving circuit (driving IC) (not illustrated) is mounted is connected to the piezoelectric element 241. Further, a peripheral portion of the vibrating plate 232 is bonded to a frame member 245, and a through portion 246 accommodating an actuator unit configured with the piezoelectric element 241, the base substrate 242, and the like, a concave portion configured with the common liquid chamber 238, and an ink supply hole 247 through which ink is supplied to the common liquid chamber 238 from the outside are formed in the frame member 245.

The nozzle plate 233 forms the nozzle 234 having the diameter of 10 µm to 30 µm, corresponding to each liquid chamber 236 and bonds with the channel plate 231 by an adhesive. The nozzle plate 233 is configured such that a water repellent layer is formed on the topmost surface with a necessary layer interposed between the water repellent layer and the surface of a nozzle forming member made of a metallic member.

The piezoelectric element 241 is a stack-type piezoelectric element in which piezoelectric materials 248 and an internal electrode 249 are alternately stacked, and is herein a PZT (PbZrO3-PbTiO3) element. An individual electrode 250 and a common electrode 251 are connected to the internal electrodes 249 which are pulled out to alternately different end surfaces in the piezoelectric element 241. In this embodiment, provided is a configuration of pressurizing ink in the liquid chamber 236 using displacement in a piezoelectric direction of the piezoelectric element 241, that is, upward displacement. Further, a structure in which the piezoelectric element 241 of one column is disposed on one substrate 242 may be provided.

In the liquid ejecting head having the above-described configuration, for example, the piezoelectric element 241 contracts as a voltage applied to the piezoelectric element 241 is lowered from a reference potential, ink flows into the liquid chamber 236 as the vibrating plate 232 moves down to expand the volume of the liquid chamber 236, the piezoelectric element 241 expands in the stacked direction as the voltage applied to the piezoelectric element 241 is increased, recording liquid in the liquid chamber 236 is pressurized as the vibrating plate 232 is deformed in the direction of the nozzle 234 to contract the volume of the liquid chamber 236, and a droplet of recording liquid is consequently ejected (discharged) from the nozzle 234.

Then, as the voltage applied to the piezoelectric element 241 returns to the reference potential, the vibrating plate 232 returns to an initial position, the liquid chamber 236 expands, and so negative pressure is generated. Thus, at this time, the recording liquid flows from the common liquid chamber 238 into the liquid chamber 236. Here, vibration of the meniscus surface of the nozzle 234 is attenuated and stable, and hereinafter an operation of ejecting a next liquid droplet is performed.

Figure 7:
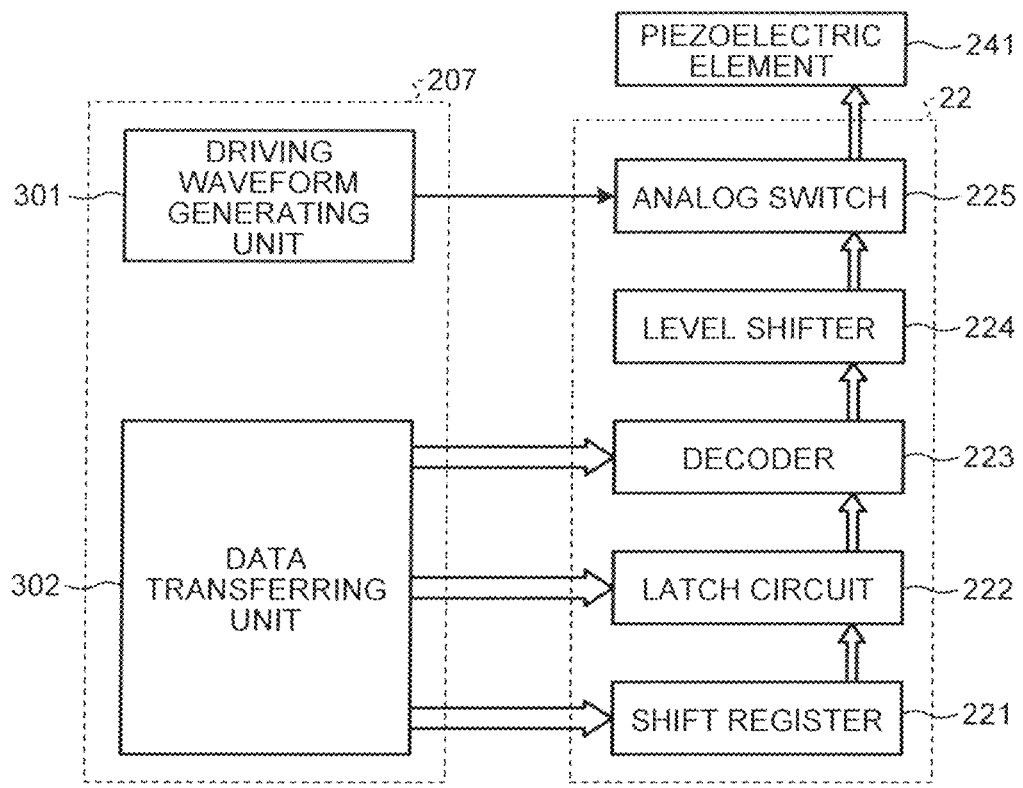
FIG. 7 is a diagram illustrating a functional configuration of a head driver according to an embodiment of the present invention.

Next, the details of the printing control unit 207 and the head driver 22 will be described with reference to FIG. 7. The printing control unit 207 includes a driving waveform generating unit 301 that generates and outputs a driving waveform (common driving waveform) configured with a plurality of driving pulses (driving signals) within one printing period as described above, and a data transferring unit 302 that outputs 2-bit printing data (gradation signals 0 and 1) corresponding to a print image, a clock signal, a latch signal (LAT), and droplet control signals M0 to M3.

The droplet control signal is a 2-bit signal used to turn on or off an analog switch 225 which is a switch unit (which will be described later) of the head driver 22 for each droplet, and the droplet control signal transitions to an H level (ON) by a waveform to be selected according to the printing period of the common driving waveform, and transitions to an L level (OFF) when not selected.

The head driver 22 includes a shift register 221 that receives a transfer clock (shift clock) and serial printing data (gradation data: 2 bits/CH) from the data transferring unit 302, a latch circuit 222 that latches each register value of the shift register 221 in response to a latch signal, a decoder 223 that decodes the gradation data and the droplet control signals M0 to M3 and outputs the result, a level shifter 224 that converts a level of a logic-level voltage signal of the decoder 223 to a level at which the analog switch 225 is operatable, and the analog switch 225 that is turned on or off (opened/closed) through an output of the decoder 223 applied via the level shifter 224.

The analog switch 225 is connected to the selection electrode (individual electrode) 250 of each piezoelectric element 241, and receives the common driving waveform input from the driving waveform generating unit 301. Thus, when the analog switch 225 is turned on according to the result of decoding the serially transferred printing data (gradation data) and the droplet control signals M0 to M3 through the decoder 223, a necessary driving signal configuring the common driving waveform passes through (selected) and is applied to the piezoelectric element 241.

Figure 8:
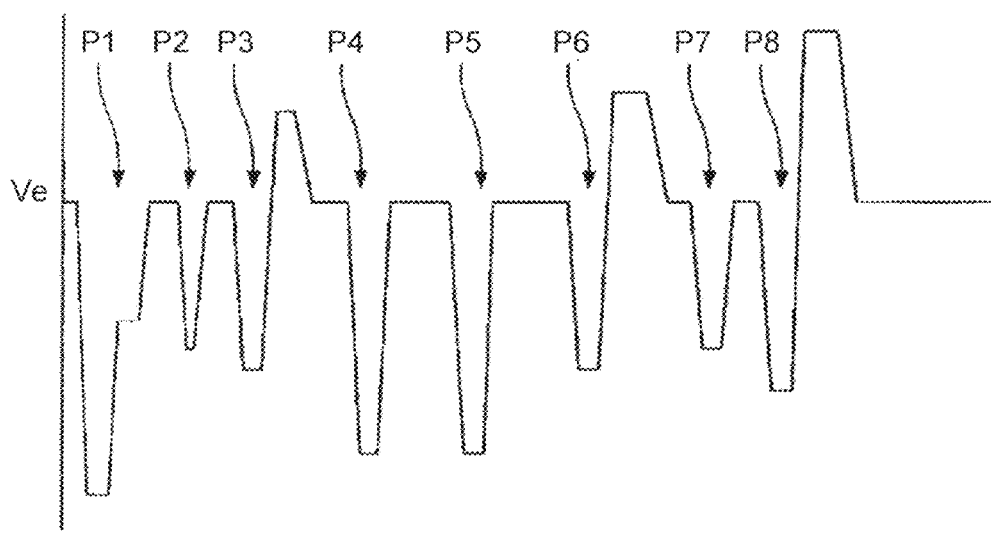
FIG. 8 is a diagram illustrating a driving signal of a head driver according to an embodiment of the present invention.

Next, an exemplary driving waveform will be described with reference to FIGS. 8 and 9. The driving waveform generating unit 301 generates and outputs a driving signal (driving waveform) configured with 8 driving pulses P1 to P8 each of which includes a waveform element falling down from reference potential Ve and a waveform element rising from the fallen state within one printing period (one driving period) as illustrated in FIG. 8. One printing period is decided depending on a maximum driving frequency. Meanwhile, the driving pulse to be used is selected by the droplet control signals M0 to M3 applied from the data transferring unit 302.

Figure 9:
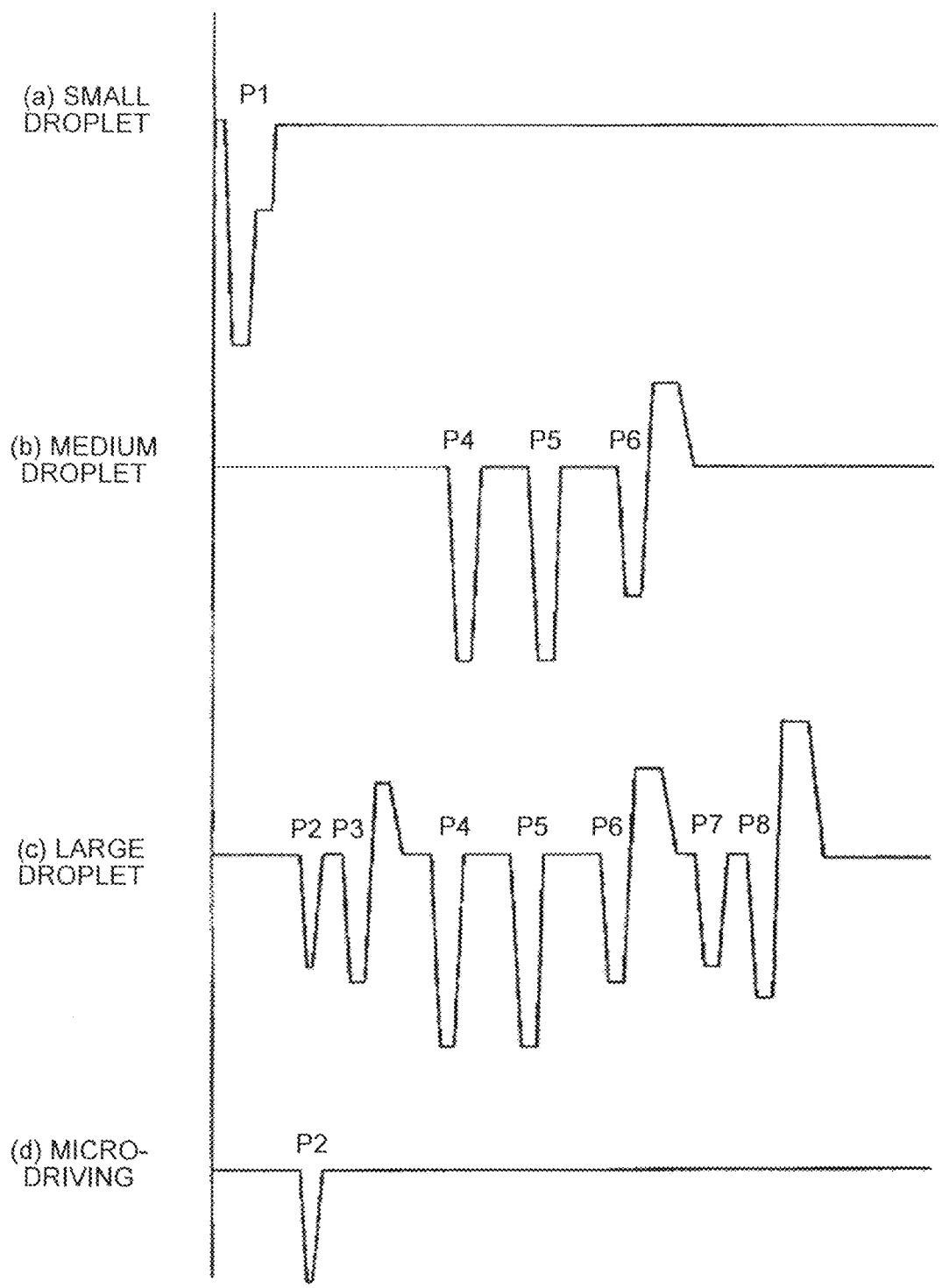
FIG. 9 is a diagram illustrating a driving signal of head driver according to an embodiment of the present invention.

According to the droplet control signals M0 to M3 applied from the data transferring unit 302, the driving pulse P1 is selected as illustrated in (a) of FIG. 9 when small droplet (a small dot) is formed, the driving pulses P4 to P6 are selected as illustrated in (b) of FIG. 9 when a medium droplet (a medium dot) is formed, the driving pulses P2 to P8 are selected as illustrated in (c) of FIG. 9 when a large droplet (a large dot), and the micro driving pulse P2 is selected as illustrated in (d) of FIG. 9 when micro-driving is performed (the meniscus is vibrated without ejecting a droplet), and then the selected driving pulse is applied to the piezoelectric element 241 of the recording head 23.

The information processing apparatus 1 and the image forming apparatus 2 perform image forming/outputting in collaboration with each other. In other words, the printer driver 110 processes the printing instruction issued from the application 101 operating in the information processing apparatus 1, and generates a multi-valued recording dot pattern which can be output by the image forming apparatus 2, the multi-valued recording dot pattern is rasterized and transferred to the image forming apparatus 2 as the rendering data, and the image forming apparatus 2 performs image forming/outputting.

Specifically, in the information processing apparatus 1, the printing instruction acquiring unit 111 acquires an image rendering command or a text recording command (for example, a command in which a position, a width, and a form of a line to be recorded are described or a command in which a font, a size, and a position of text to be recorded is described) from the application 101 or the operating system, and temporarily stores the image rendering command or the text recording command in a rendering data memory. The commands are described in a specific print language.

Further, the command stored in the rendering data memory is interpreted by a rasterizer equipped in the rendering information generating unit 112. In the case of a line recording command, conversion into a recording dot pattern according to the designated position, the width, and the like is performed. In the case of a text recording command, corresponding text contour information is called from font outline data stored in the information processing apparatus 1, and conversion into a recording dot pattern according to a designated position or size is performed. In the case of image data, conversion into a recording dot pattern is performed as is.

Hereinafter, the rendering information generating unit 112 performs image processing on the recording dot pattern, and stores the processing result in the raster data memory. At this time, the information processing apparatus 1 performs rasterizing into data of the recording dot pattern using an orthogonal grid as a basic recording position. Examples of image processing include a color management process or a γ correction process for adjusting a color, a half-toning process such as a dithering technique or an error diffusion technique, a background removal process, and a total ink volume control process. Further, the rendering information transferring unit 113 transfers the recording dot pattern stored in the raster data memory to an ink jet printer 500 via an interface.

As described above, among the processes performed in the rendering information generating unit 112, the half-toning process refers to a process of converting a gradation of color expression in image information which is to be subjected to image forming/outputting according to a gradation of color expression in image forming/outputting performance by the image forming apparatus 2.

As described above, in the image forming apparatus 2 of the ink jet type, image forming/outputting is performed by ejecting ink from the nozzle 234 of the recording head 23 and forming the respective pixels. At this time, as described above, an ink droplet to be ejected is switched to a small droplet, a medium droplet, or a large droplet, and thus it is possible to implement density expressions of 4 gradations (2 bits) including an achromatic color. However, in the PC such as the information processing apparatus 1, it is common that image data is processed with 256 gradations (8 bits) or the like.

Thus, in the half-toning process, for example, image data expressed by 8 bits is converted into image data expressed by 2 bits without deterioration of the image quality visually recognized by people. When pre-conversion image data is compared with post-conversion data in units of pixels, the pre-conversion image data significantly differs from the post-conversion data because a density gradation has been reduced. Thus, in the half-toning process, image conversion is performed by an area gradation technique so that two images are visually recognized as the same image by people when the images are compared in units of certain areas including a plurality of pixels. As a result, a quantization error caused by the area gradation technique occurs in the half-toning process.

As a half-toning process in which the quantization error is considered, the error diffusion technique and the direct binary search (DBS) technique are known. The error diffusion technique is a technique of weighting and accumulating the quantization errors occurred in respective pixels and diffusing the errors to the neighboring pixels, and compared to a technique of performing quantization by a comparison with a specified repetitive pattern as in the dithering technique, texture, moire, or the like is unlikely to occur. The DBS reduces an error by repeatedly performing a process of temporarily deciding a dot arrangement, calculating a quantization error with an input in the dot arrangement while switching on/off or types of dots in units of pixels or in units of sections, and updating the dot arrangement when the errors are reduced, and thus sharpness of an image is excellent, and regular patterns such as worms occurring by error diffusion are unlikely to occur.

The above process relates to data processing and is merely theoretical. In digital data, each pixel is dealt in a square shape, but each dot (hereinafter, referred to as a "landed image") formed such that ink ejected from the nozzle 234 is fixed onto a paper has a circular shape. For this reason, a way of burying a plane of paper differs according to the presence or absence of a dot at a neighboring pixel position or a dot type.

Further, ink is ejected from the nozzle 234 according to mechanical control as described above with reference to FIGS. 6A and 6B. For this reason, the respective nozzles 234 differ in characteristics of a landed image due to various factors such as response characteristics of the piezoelectric element 241 or the fine shape of the nozzle 234. For this reason, there are cases in which, even when driving is performed based on the same driving signal, the size of a dot of a landed image differs, a landing position is misaligned, a satellite occurs and influences a neighboring pixel. Here, the satellite refers to a tiny droplet ejected together with a main droplet.

As a result, since it is desired to print uniform data but differences occur in the amount of attached ink or an overlapping pattern of dots due to characteristics of individual heads or nozzles, people may visually recognize this phenomenon as image flaw such as a tone difference, a stripe, or banding.

In order to solve the above problem, the rendering information generating unit 112 according to the present embodiment generates printing data including engine characteristics by forming a dot landing model instead of a digital value and perform an error calculation when a dot switching process is performed based on an error calculation by the DBS technique.

To this end, when image forming/outputting is performed using the image forming apparatus 2 according to the present embodiment, as pre-processing, an image patch generated by the dot pattern generating unit 114 is printed, the scan image acquiring unit 115 acquires patch image data generated by scanning the image patch through a sensor, a scanner, or the like, and the nozzle characteristic determining unit 116 generates a landing model of a dot to be formed by the nozzles 234 of the image forming apparatus 2 based on the patch image data. In a rendering data generation process of subsequent image forming/outputting, the rendering information generating unit 112 simulates a dot to be ejected by each nozzle 234 using the landing model.

First, an exemplary image pattern generated by the dot pattern generating unit 114 will be described. The dot pattern generating unit 114 according to the present embodiment generates, for example, image patterns illustrated in (a) and (b) of FIG. 10, inputs the generated image patterns to the printing instruction acquiring unit 111, and causes the image forming apparatus 2 to perform image forming/outputting of the image patterns. The scan image acquiring unit 115 acquires image data generated by reading a resultant output paper through a scanner or the like, and the nozzle characteristic determining unit 116 acquires a model of a dot to be formed by the nozzles 234.

Figure 10:
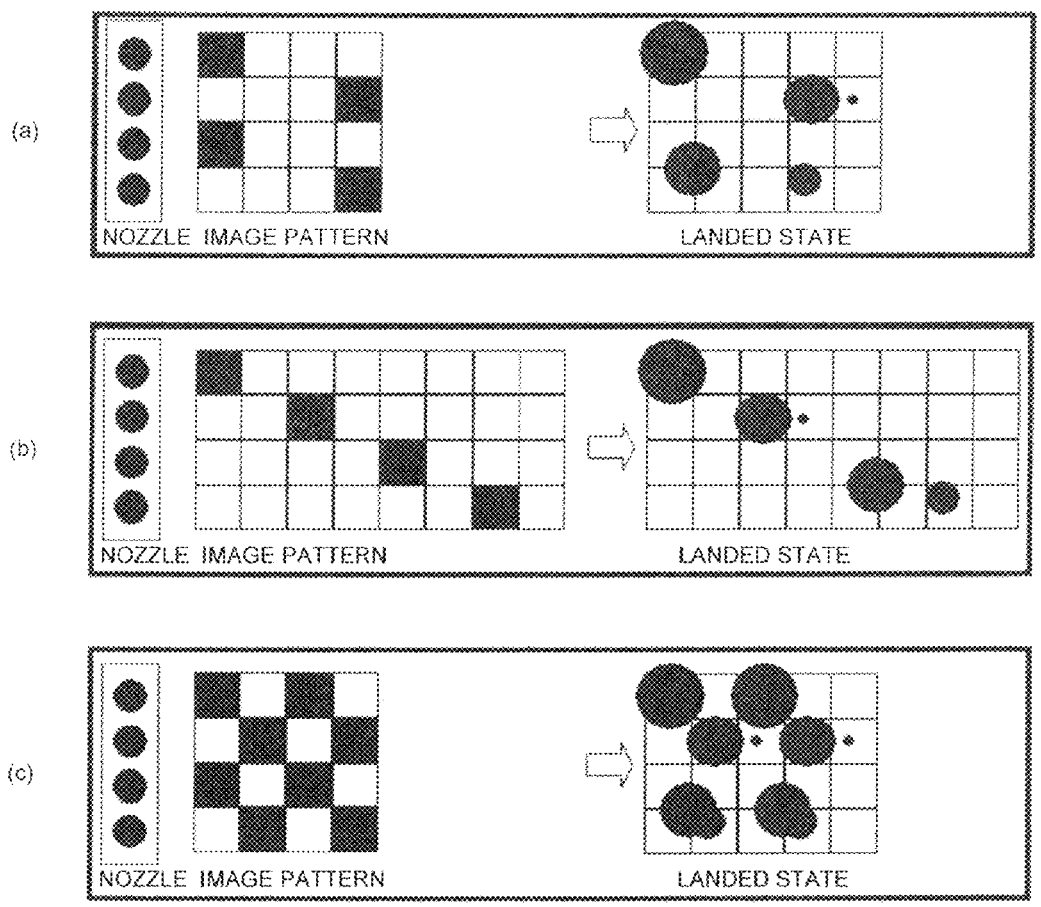
FIG. 10 illustrates exemplary dot patterns and exemplary landing states according to an embodiment of the present invention.
Figure 11:
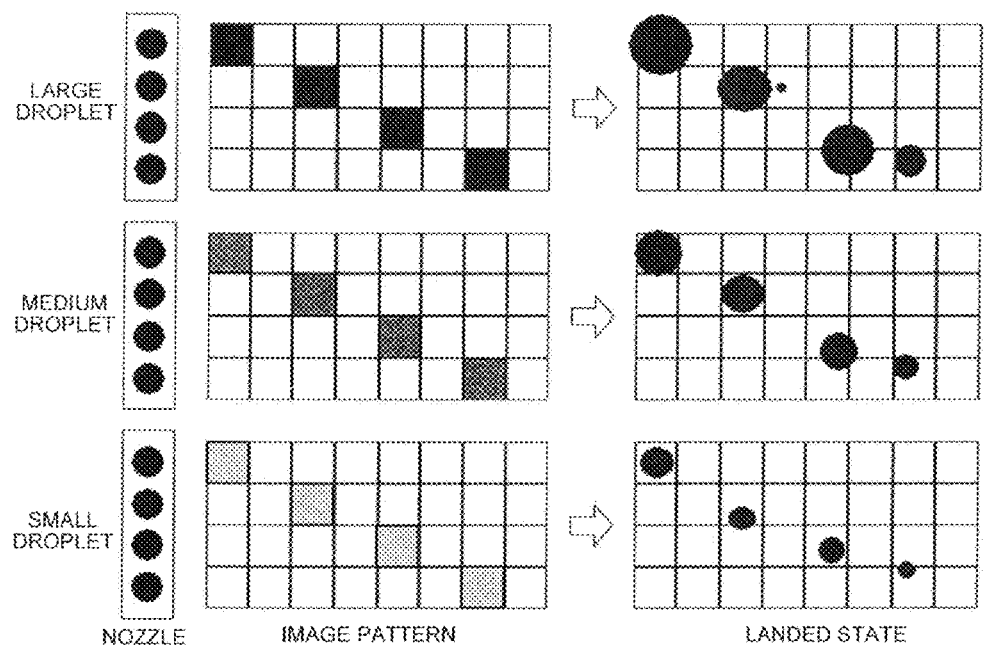
FIG. 11 illustrates exemplary dot patterns and exemplary landing states according to an embodiment of the present invention.

The nozzle characteristic determining unit 116 compares the dot pattern generated by the dot pattern generating unit 114 with image information obtained by scanning the dot pattern acquired by the scan image acquiring unit 115, that is, dot pattern image information as illustrated in (a) and (b) of FIG. 10 and FIG. 11. As a result, the nozzle characteristic determining unit 116 generates nozzle characteristic information including the position at which ink ejected by each of the plurality of nozzles 234 equipped in the image forming apparatus 2 is attached onto a paper which is an image forming/outputting target medium, the size of ink to be attached, the shape of ink to be attached, and satellite (distribution of ink to be attached) information.

FIG. 10 illustrates examples in which patterns of four rows are formed using the carriage 21 in which the nozzles 234 are arranged in four rows and one column. This is a most basic example in which one nozzle 234 is disposed for each color of CMYK, and an image pattern to be formed is set according to an arrangement of the nozzles 234 such as a recording head of a line type.

The layout of the image pattern generated by the dot pattern generating unit 114 is not specially limited, but when a dot forming density of a pattern is high, surrounding dots join as illustrated in (c) of FIG. 10, and it is difficult to identify a correspondence relation between a dot and a nozzle that has ejected the dot. Thus, it is desirable that patterns have sufficient intervals therebetween so that a correspondence relation between a dot and a nozzle that has ejected the dot can be identified as illustrated in (a) and (b) of FIG. 10 even when the size or the landing position of a dot varies.

Further, in the case of a printer dealing dots of two or more sizes, the size of a dot serving as a reference differs according to a droplet type. Further, there are cases in which landing characteristics differ according to a droplet type, for example, large droplets are landed at an aimed position, but medium droplets are likely to bend. For this reason, it is desirable to print and read an image pattern to acquire a landing model for each droplet as illustrated in FIG. 11.

Next, the half-toning process performed by the rendering information generating unit 112 according to the present embodiment will be described. The rendering information generating unit 112 according to the present embodiment employs the DBS technique. Specifically, quantization errors are reduced such that an error of a dot in a region of interest with an input image is obtained while changing on/off or a type of a dot, that is, while changing a density within a gradation supported by the image forming apparatus 2, and when an error is more reduced than before changed, an arrangement is updated with changed content.

Here, a change of a pixel of interest or an error determination process may be performed in units of pixels. Further, combinations of on/off of dots and switching to dots of different types in a certain zone may be performed, and an arrangement may be selected under a combination condition in which an error in a section is reduced. Further, since actual data includes a dot gain, there are cases in which influence of a neighboring pixel before and after processing is not reflected in an error. For this reason, after data undergoes the entire process once, a process of calculating an error again or reviewing an arrangement may be performed, and at this time, a method of cutting a section in which an arrangement is reviewed may be changed.

As a condition of ending a process, the process may end based on the number of processes or when errors are less reduced compared to the previous process. Further, in the first round, the half-toning process such as the dithering process or the error diffusion process may be performed, and the process may start from the arrangement. In addition, determination of a switching process after an error comparison may be performed using a simulated annealing technique or the like instead of being performed each time when an error is minimum.

The feature of the present invention lies in that an error is evaluated using an acquired dot model rather than simple digital data when the error calculation is performed. To this end, the rendering information generating unit 112 replaces a dot arrangement of an image obtained by converting a dot arrangement of a processing target, that is, image data of an output target according to a gradation of the image forming apparatus 2 with dot models of the respective nozzles 23, and simulates a landed image, based on nozzle characteristics acquired by the nozzle characteristic determining unit 116.

Figure 12:
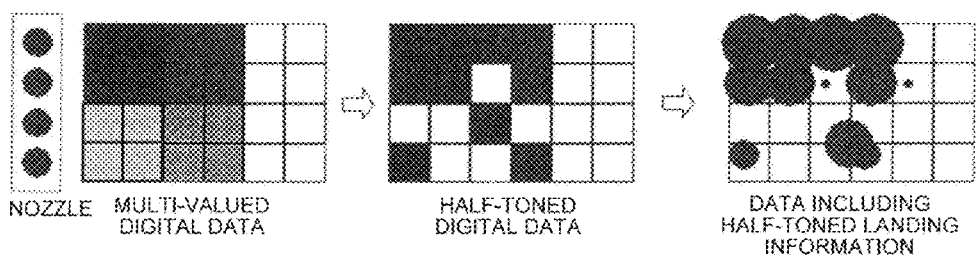
FIG. 12 is a diagram illustrating an example of landing simulation according to an embodiment of the present invention.

For example, the rendering information generating unit 112 first performs the half-toning process on input data at the left side of FIG. 12, that is, original image data of an output target in each nozzle, and performs quantization as illustrated in the center of FIG. 12. Further, the rendering information generating unit 112 generates data obtained by deducing a landing state when the respective nozzles 234 eject ink, that is, data obtained by deducing the distribution of ink based on nozzle characteristics acquired by the nozzle characteristic determining unit 116 as illustrated in the right side of FIG. 12.

Then, the rendering information generating unit 112 calculates an error between the landed image and the input data. At this time, the rendering information generating unit 112 calculates the error by comparing ink attachment in an area corresponding to a pixel of the input data with a level of the input image. For example, multi-valued level conversion is performed based on the amount in which a portion corresponding to a pixel of the input data is covered with ink. For example, when the input data is assumed to have the density gradation of 0 to 255 (here, 255 represents black) and the covered amount of an area in the corresponding pixel is 50%, an output of the portion is 127 which corresponds to a half of 0 to 255, and the difference with the input data is regarded as an error.

Figure 13:
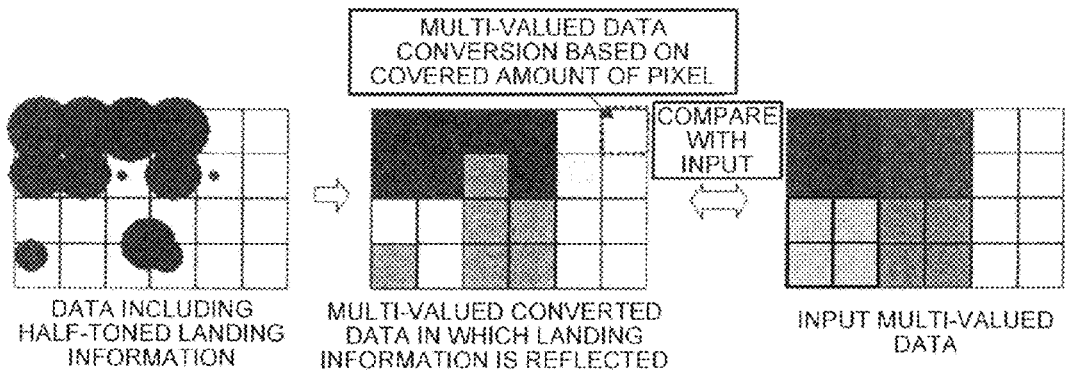
FIG. 13 is a diagram illustrating an example of a quantization error comparison according to an embodiment of the present invention.

The left side of FIG. 13 illustrates simulated data corresponding to the right side of FIG. 12. Further, the right side of FIG. 13 is input data corresponding to the left side of FIG. 12. The rendering information generating unit 112 converts data at the left side of FIG. 13 into multi-valued data so that the ink-covered amounts 0% to 100% correspond to the respective density gradations 0 to 255, and generates multi-valued simulation data illustrated in the center of FIG. 13. The difference obtained by comparing the generated multi-valued simulation data with the input data at the right side of FIG. 13 is regarded as an error.

The process illustrated in FIG. 13 may be performed based on brightness or density rather than the covered amount (for example, conversion is performed such that the maximum density corresponds to 255, and the minimum density (=paper plane density) corresponds to 0. As described above, the rendering information generating unit 112 according to the present embodiment decides the quantization condition in which an error with an input is reduced by conditioning including engine characteristics by adding nozzle characteristic and then repeating a calculation/comparison of an error while changing the quantization condition.

Figure 14:
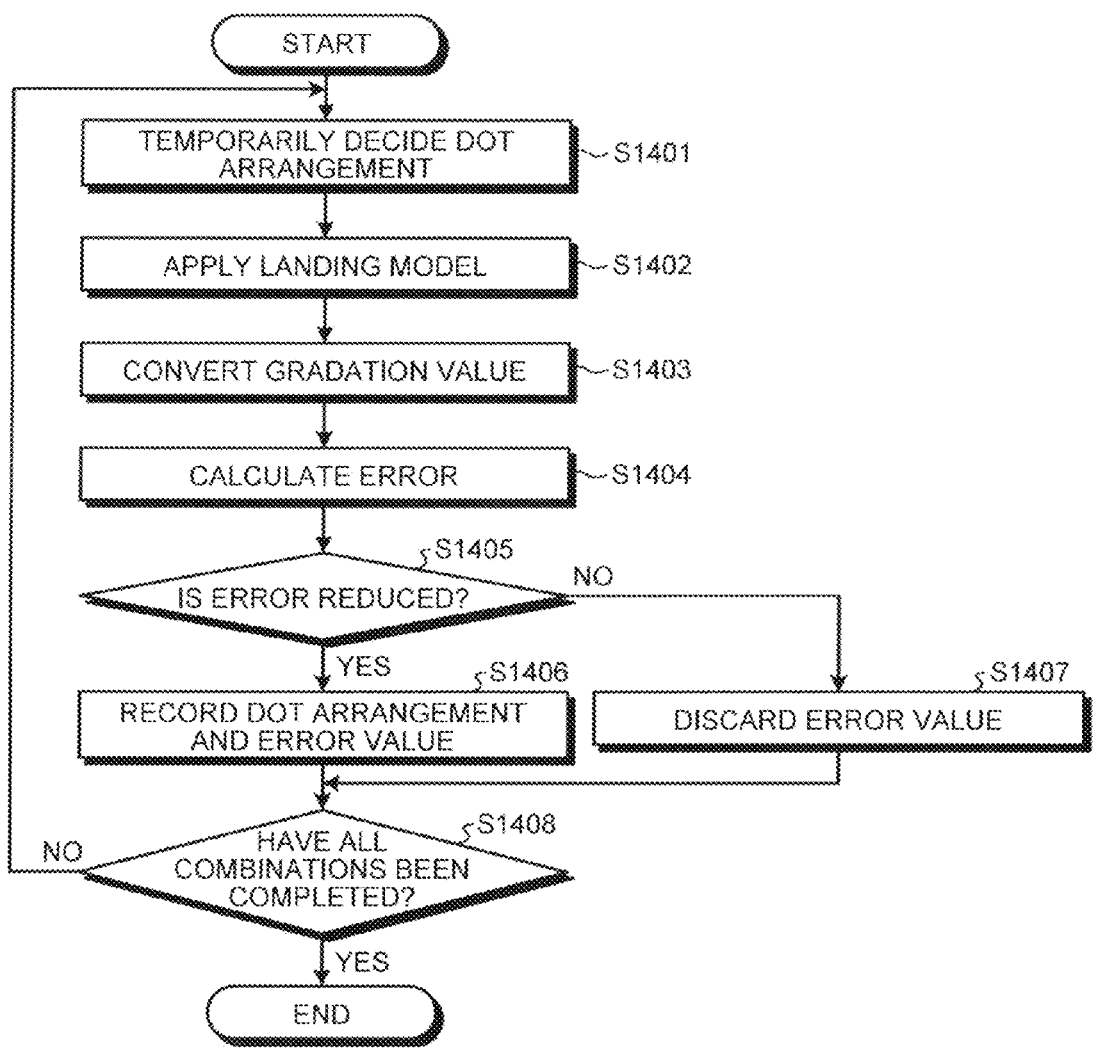
FIG. 14 is a flowchart illustrating an operation of a rendering information generating unit according to an embodiment of the present invention.

FIG. 14 is a flowchart illustrating an exemplary operation of the rendering information generating unit 112 according to the present embodiment. FIG. 14 will be described in connection with an example in which a total number of pixels in an image of an output target is "M", and the density gradation of the image forming apparatus 2 for an achromatic color, a small droplet, a medium droplet, and a large droplet is "A". As illustrated in FIG. 14, first of all, the rendering information generating unit 112 temporarily decides a dot arrangement on all M pixels (S1401).

In other words, the process of S1401 is a process of generating an image with a converted gradation by converting a gradation of an image of an image forming/outputting target into a gradation of a pixel which can be expressed in the recording head 23 of the image forming apparatus 2 such as a process of converting multi-valued digital data at the left side of FIG. 12 into half-toned digital data at the center thereof. In other words, the rendering information generating unit 112 functions as a gradation converting unit.

Then, the rendering information generating unit 112 applies the landing model to the dot arrangement temporarily decided in S1401, and generates landing simulation data as illustrated in the right side of FIG. 12 (S1402). In other words, the process of S1402 is a process of generating simulation information of an image forming/outputting result based on information representing characteristics of the nozzle 234 equipped in the recording head 23 of the image forming apparatus 2 and the image with the converted gradation. In other words, the rendering information generating unit 112 functions as an output result simulating unit.

Then, the rendering information generating unit 112 performs gradation value conversion on the landing simulation result, and generates multi-valued converted data as illustrated in the center of FIG. 13 (S1403). The process of S1403 is a process of converting the simulation information of the image forming/outputting result into a gradation of pixels configuring an image of an image forming/outputting target which is an original image.

When the multi-valued converted data is generated, the rendering information generating unit 112 compares pixels of the multi-valued converted data with pixels of the input data, and calculates a quantization error as described above with reference to the center and the right side of FIG. 13 (S1404). In other words, in S1403 and S1404, the rendering information generating unit 112 functions as a simulation error calculating unit. After calculating the error, the rendering information generating unit 112 compares a quantization error which has been previously calculated and recorded with a newly calculated error (S1405), and records the current dot arrangement and the newly calculated error value in a storage medium (S1406) when the error value of the newly calculated error is smaller than the previously calculated one (YES in S1405).

Meanwhile, when the error value is not smaller (NO in S1405), the rendering information generating unit 112 discards the error value (S1407). The rendering information generating unit 112 repeatedly performs the process of S1401 to S1407 until all dot arrangement combinations are completed (NO in S1408), and ends the process when all combinations are completed (YES in S1408).

In other words, the process of S1408 is a process of deciding one of a plurality of images with converted gradations which differ in a gradation conversion form when the image with the converted gradation is generated in S1401 as rendering information based on the error value calculated in S1404. In other words, the rendering information generating unit 112 functions as a rendering information deciding unit. Through the above process, a dot arrangement having the smallest error value is recorded. Here, the above process is a process for a dot arrangement of a first set, and when there is no error value which has been previously stored, the rendering information generating unit 112 records the calculated error value without performing the process of S1405.

Figure 15:
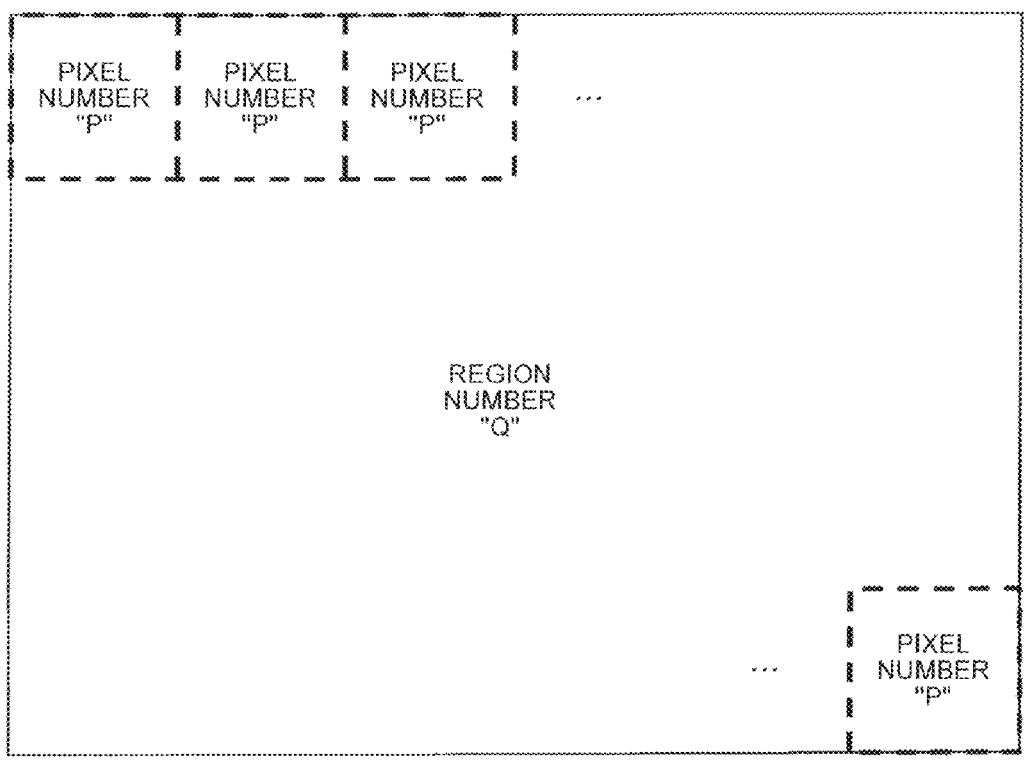
FIG. 15 is a diagram illustrating an exemplary quantization process of each divisional region according to an embodiment of the present invention.

Further, instead of testing combinations in which contents of pixels are rearranged on all pixels as illustrated in FIG. 14, an arrangement combination having the smallest error may be decided such that a target image is divided into a plurality of regions, and a combination in which contents of pixels are rearranged is tested by performing the process of FIG. 14 for each of the regions. In this case, since the arrangement is decided for each region, the number of dot combinations is smaller than the number of dot combinations of FIG. 14 which is "A^M", and thus the calculation amount is suppressed. For example, as illustrated in FIG. 15, the number of pixels in one region is "P", and the density gradation of the image forming apparatus 2 is "A" (including the absence of a dot), and the number of divided regions is "Q", "Q×A^P" combinations are made.

Here, the respective regions may be arranged in parallel or may be arranged in order according to a priority order. When a priority order is given, an arrangement condition of a certain region is decided, and when an arrangement condition of a region adjacent to the region is decided, a dot arrangement is searched in a state in which a landing model of a previously processed region is reflected. This will be described with reference to FIG. 16.

Figure 16:
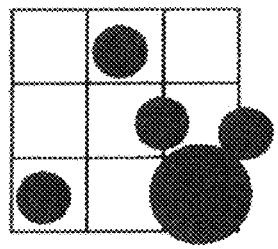
FIG. 16 illustrates exemplary quantization process of each divisional region according to an embodiment of the present invention.

Illustrated in (a) of FIG. 16 is an example in which one region is divided into 3×3 squares. When the landing model is reflected, there are cases in which actual attached ink protrudes from the region due to influence of a dot gain, bending, and a satellite. When the process is performed in parallel, because each dot arrangement has not been decided between neighboring regions, there is no information of this boundary portion, and thus it is difficult to perform accurate simulation.

On the other hand, when the priority order is decided and the process is performed in order, because the dot arrangement of the previously processed region has been decided, the dot arrangement can be selected in a region adjacent thereto such that the landing information of the previously processed region is reflected.

A method in which the priority order of the sequential process is performed is not limited, but for example, there are a method of processing in the raster order as illustrated in (b) of FIG. 16, a method of processing in the order that starts from the upper left as illustrated in (c) of FIG. 16, a method of processing in the order that starts from the center as illustrated in FIG. 16D, and a method of processing according to the priority order given by a fixed pattern of the Bayer form as illustrated in (e) and (f) of FIG. 16.

Here, compared to the method illustrated in (b) of FIG. 16, the methods illustrated in (c) to (f) of FIG. 16 are larger in the number of regions that can be simultaneously processed, can easily perform the parallelization process by a calculation technique such as multiple cores, and are advantages in terms of the processing speed. As described above, when a region is allocated a priority order and the process is performed in order, more accurate landing simulation is performed by searching an arrangement of a next region in the state in which the landing model of the previously processed region is reflected, and thus rendering data can be generated so that high-accuracy image forming/outputting is performed in view of nozzle characteristic.

Here, in both FIGS. 14 and 15, when the quantization condition is changed, that is, when a chromatic color and an achromatic color are switched on a certain pixel or the gradation value in the density gradation of the image forming apparatus 2 is changed, the landing simulation generated by applying the landing model in S1402 of FIG. 14 is updated as well with the change of the pixel.

Figure 17:
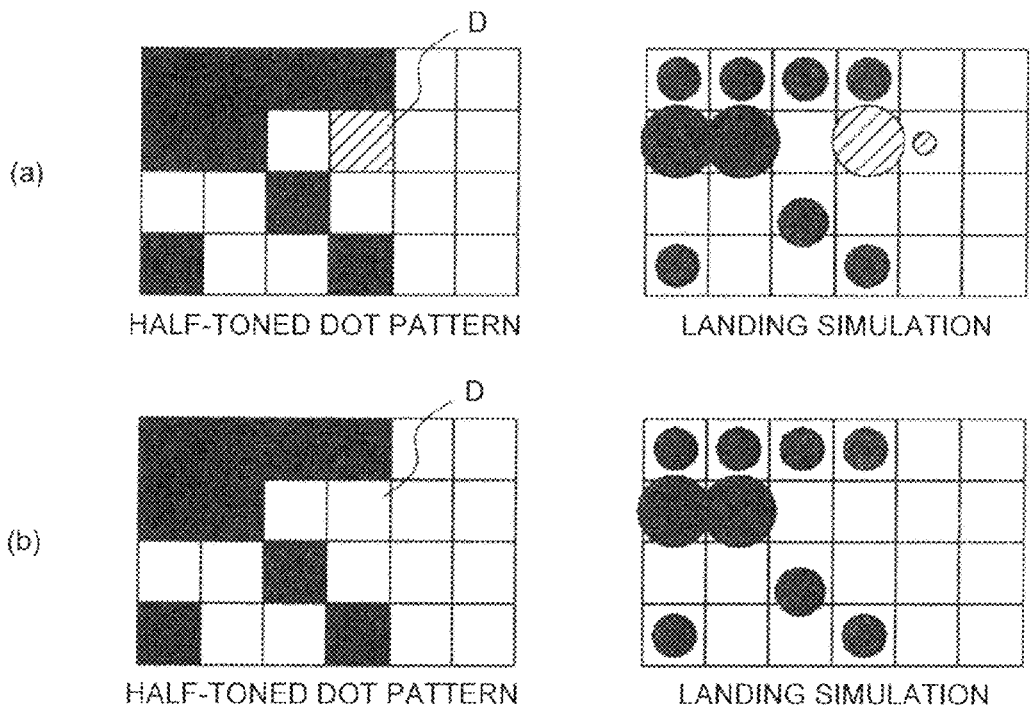
FIG. 17 illustrates exemplary dot patterns and exemplary landing states according to an embodiment of the present invention.

In this case, landing simulation of a dot pattern illustrated at the left side of (a) of FIG. 17 is changed to that in the right side of (a) of FIG. 17. As illustrated at the right side of (a) of FIG. 17, landing simulation corresponding to a pixel D influences the covered amount of surrounding pixels according to the size of a dot or a satellite.

Further, when the quantization condition is changed so that the dot pattern illustrated at the left side of (a) of FIG. 17 is changed to the dot pattern illustrated at the left side of (b) of FIG. 17, the pixel D becomes achromatic, and thus since the covered amount of the surrounding pixel as well as the pixel D is changed as well as illustrated at the right side of (b) of FIG. 17, it is necessary to redo the gradation value conversion of S1403 even on the surrounding pixel.

As described above, according to the information processing apparatus 1 in which the printer driver 110 causing the image forming apparatus 2 to perform image forming/outputting is installed in the present embodiment, when an error value between a dot pattern quantized by the DBS technique and original image data is calculated and an optimal dot pattern is selected, an error value between the landing simulation and the original image data is calculated based on landing characteristics of ink ejection by the nozzle of the recording head 23 equipped in the image forming apparatus 2, and thus it is possible to perform image forming/outputting according to characteristics of the image forming/outputting engine.

Here, the dot landing model may be changed according to an operation condition of a device. For example, the operation condition of the device refers to a type of paper or a mode used for printing or printing environments such as a temperature or humidity. This is because, when a type of paper is different, even when the same dot is ejected, a wet spreading property on a plane of paper is different. Further, when a mode or a printing environment changes, a driving condition of a head to be used for printing, a conveying speed of paper, and ink viscosity depending on a temperature or humidity changes, and thus ejection characteristics of the head changes.

For this reason, it is preferable that acquisition or reflection of the landing model be settable or applicable for each type of paper, each printing mode, or each printing environment. In this case, it is possible to perform image forming under a condition optimal to a printing condition.

As a timing to acquire a landing model, various factors can be used as a trigger. For example, a landing model may be acquired when a device starts up, when a head is replaced, when a certain period of time elapses in an operation period of time of a device, when a certain number of sheets are printed, when an operation environment of a device such as a temperature or humidity changes a certain degree or more, when a type of paper or a mode is changed, or when a user instruction is given. This is because a change in a configuration or a use environment of a device, a change over time, and the like are conditions in which landing characteristics are likely to change.

When a head is replaced, landing characteristics changes in a replaced head unit. Further, since a head is commonly replaced for each of respective colors such as CMYK, a landing model may be acquired only for a replaced head, and in this case, man-hours can be reduced.

It may be performed through all of a series of processes from printing of an image pattern to acquisition of a landing model and reviewing thereof or may be performed by only some processes. For example, the process may be performed until patch image data is acquired by the scan image acquiring unit 115 and a landing model is generated by the nozzle characteristic determining unit 116, and when a difference between a newly generated landing model and a landing model which has been previously generated and is now being applied exceeds a certain threshold value, a landing model may be updated, and in this case, the processing man-hours can be reduced.

This process may be implemented, for example, such that, when an image pattern is printed, a gradation or a color patch is also printed to get a characteristic, and when the characteristic changes a certain degree or more, a landing model is reviewed. For example, the brightness, the density, or a RGB value of information acquired by a sensor or a scanner may be used as the characteristic, and when the characteristic changes a certain degree or more, a landing model may be updated.

As another method, a method of reviewing when the amount by which a nozzle is covered with ink is beyond a specified amount is considered. A review criterion may be specified by an absolute value, and when an image pattern is printed, a pattern is printed twice or more times to find a variation repeated at the time of continuous printing, and when it is exceeded, the characteristics are determined to have been changed, and thus the landing model is updated.

The above embodiment has been described in connection with the example in which the scan image acquiring unit 115 and the nozzle characteristic determining unit 116 are equipped in the printer driver 110 of the information processing apparatus 1 as illustrated in FIG. 3. However, the elements may be equipped in the image forming apparatus 2, and the landing model may be downloaded from the image forming apparatus 2 to the information processing apparatus 1. When the image forming apparatus 2 is configured to independently generate the landing model, the image forming apparatus 2 can independently perform processing on an image in which engine characteristics are considered from generation thereof to an output thereof.

When the concrete examples of the information processing apparatus 1 and the image forming apparatus 2 are a printing machine for business purpose and a control device, in devices used in a field of printing, in many cases, a half-tone image is generated through a dedicated device called a raster image processor (RIP) or software and then input to an image forming apparatus for image printing, or an advanced function or an operation mechanism for image processing is provided.

Thus, it is possible to implement any one or all of an output of a chart, acquisition of a landing model, and generation of image data at the RIP side, that is, the information processing apparatus 1 side. In this case, since it is possible to process data including engine characteristics through the RIP and transfer the processing result to the device side, even when the image forming apparatus does not have a function of correcting the engine characteristics particularly, it is possible to correct the engine characteristics as long as the RIP is supported.

The above image processing is effective regardless of a configuration such as a serial type or a line type, but particularly, the effects are remarkable in the image forming apparatus of the serial type having a configuration in which heads are connected or the image forming apparatus of the line type. The device of the serial type in which heads are connected aims to improve productivity by connecting a plurality of heads in the longitudinal direction of the head as illustrated in a schematic diagram of (a) of FIG. 18 and broadening a region that can be created by single scan. The device of the serial type illustrated in (a) of FIG. 18 is usually employed in a device that needs to print a wide image area such as poster printing.

Figure 18:
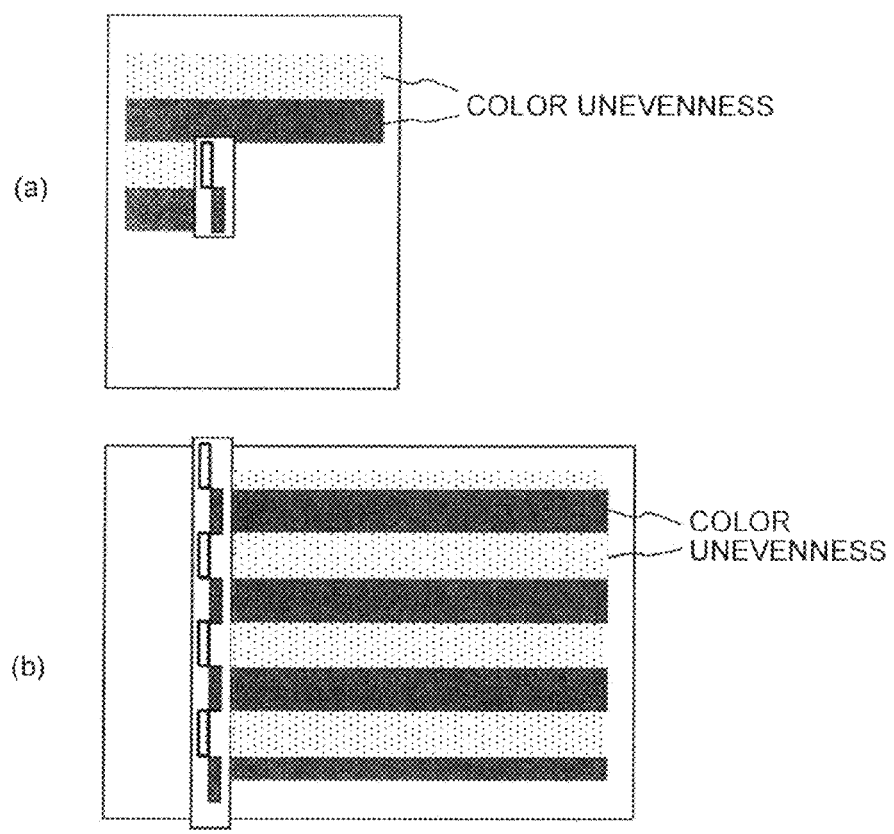
FIG. 18 illustrates an exemplary recording head of a serial type (a) and an exemplary recording head of a line type (b) according to an embodiment of the present invention.

Further, the image forming apparatus of the line type is an image forming apparatus of a type in which heads are arranged over the entire width of paper as illustrated in a schematic diagram of (b) of FIG. 18, and an image is formed while conveying a sheet of paper in a direction perpendicular to the longitudinal direction of the head. The image forming apparatus of the line type is high in productivity and thus attracts attention in a field of commercial printing or the like.

In this configuration, the number of dealt nozzles is very large, and particularly, in the line type, since an image is formed by a single pass, a landing state contributes directly to an image quality. Further, for a line head, it is difficult in terms of a technology and a cost to make a single long head, and it is realistic to form and mount a head array by arranging a plurality of short heads. For this reason, when there is a manufacturing variation in a head or a nozzle, there are cases in which a variation caused by a difference in driving circuit systems or ink supply systems connected to respective heads or nozzles has influence.

Further, since a plurality of heads is assembled, depending on an assembly accuracy of heads, a relative landing position of a dot deviates from a target, that is, there are cases in which landing characteristics are uneven due to factors different from ejection characteristics, and there are also cases in which color unevenness occurs in the form of a band or a stripe as illustrated in (a) and (b) of FIG. 18.

In the device having the above configuration, the half-toning process is performed based on the landing model, and thus it is possible to perform image correction in view of positional deviation information caused by a machine as well as a variation at the ink ejection side such as a current system of the recording head 23 or the head driver 22 and an ink supply system to the recording head 23.

In the image forming apparatus of the line type or the image forming apparatus of the serial type having the connective head configuration, there are cases in which end nozzles of adjacent heads are arranged to overlap with each other, and an overlapping process of forming an image of an overlapping portion by hitting a dot through the overlapping nozzles is performed. Further, in adjacent scanning of the serial type, and there are cases in which a line feed operation is performed so that end nozzles overlap, and an overlapping process of forming an image of an overlapping portion by hitting a dot through the overlapping nozzles is performed.

When a position at which heads are assembled deviates, there are cases in which dot landing deviation occurs at a portion at which heads are connected, and an image strip occurs, and thus the overlapping process aims to suppress landing deviation and reduce a stripe by causing nozzles of the connected portion to overlap and hitting a dot of the portion by the overlapping nozzles.

In the image forming apparatus using the overlapping process, a plurality of nozzles arranged to overlap is used for an image of an overlapping portion. Thus, in the image forming apparatus using the overlapping process, in order to apply the present embodiment, a data hitting method needs to be associated with a landing model to process the portion of the overlapping nozzles.

Figure 19:
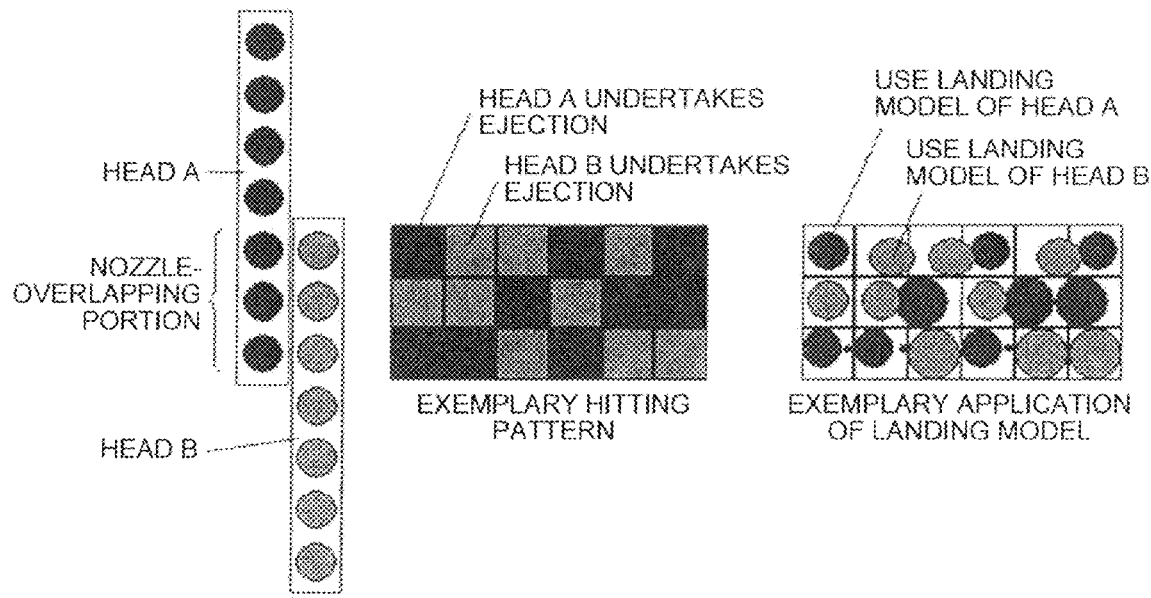
FIG. 19 is a diagram illustrating on exemplary recording head performing an overlapping process according to an embodiment of the present invention.

FIG. 19 illustrates an example in which an end portion of a head A overlaps with an end portion of a head B, and a head forming a dot of an overlapping portion is assigned according to a mask pattern. When dots of an overlapping portion are hit by the head A and the head B as in a hitting pattern illustrated in FIG. 19, the rendering information generating unit 112 applies a landing model corresponding to a nozzle that undertakes image forming after assigning as in the landing model application example illustrated in FIG. 10.

In order to make it possible to perform the process illustrated in FIG. 19, the rendering information generating unit 112 and the nozzle characteristic determining unit 116 hold information (hereinafter, referred to as "hitting information") that corresponds to the hitting pattern illustrated in FIG. 19 and represents hitting of a nozzle overlapping portion. Further, when a landing model is generated based on patch image data acquired by the scan image acquiring unit 115, the nozzle characteristic determining unit 116 generates a landing model for each of the head A and the head B based on the hitting information.

Further, when a landing simulation is generated by applying the landing model in S1402 of FIG. 14, the rendering information generating unit 112 generates a landing simulation based on the hitting information. Through this process, the image forming apparatus using the overlapping process can obtain the same effects by applying the landing model process according to the present embodiment.

Figure 20:
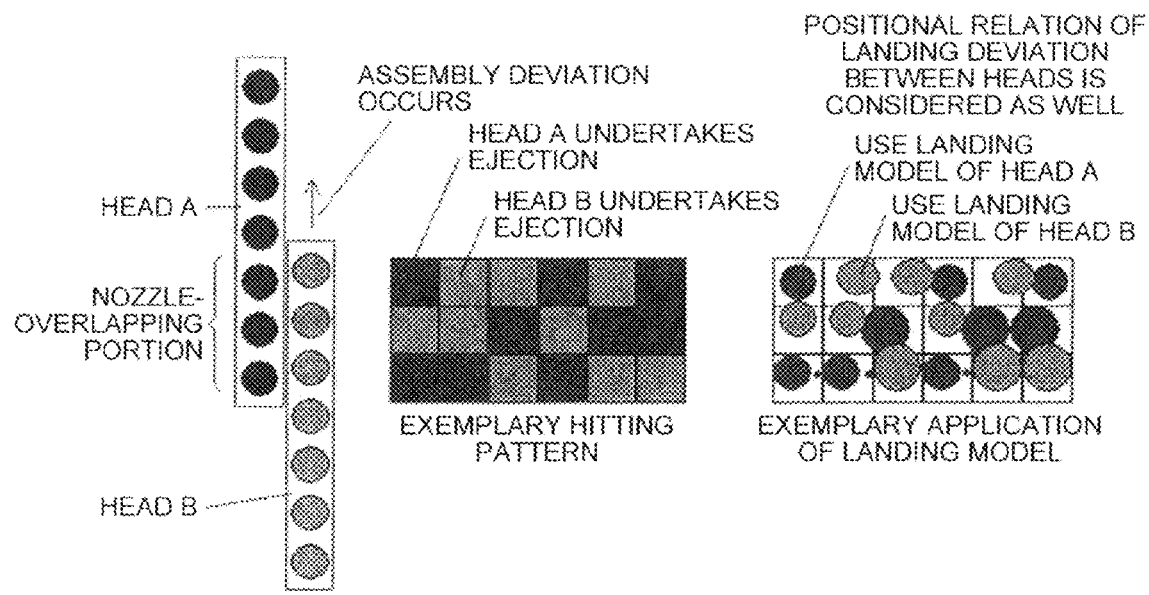
FIG. 20 is a diagram illustrating an exemplary recording head performing an overlapping process according to an embodiment of the present invention.

FIG. 20 illustrates an example in which assembly deviation between the head A and the head B occurs in the same hitting pattern as in FIG. 19. In this case, the landing model is applied in the form in which positional information of each of the heads A and B is included.

Further, in the serial printer, there are cases in which a multi-scan operation is performed. The multi-scan operation is an operation in which ink is ejected onto the same range multiple times while moving the carriage at a pitch smaller than a pitch of a plurality of nozzles 234 disposed in the recording head 23, and thus an image can be formed at a resolution smaller than the pitch of the nozzles 234.

Figures 21, 22:
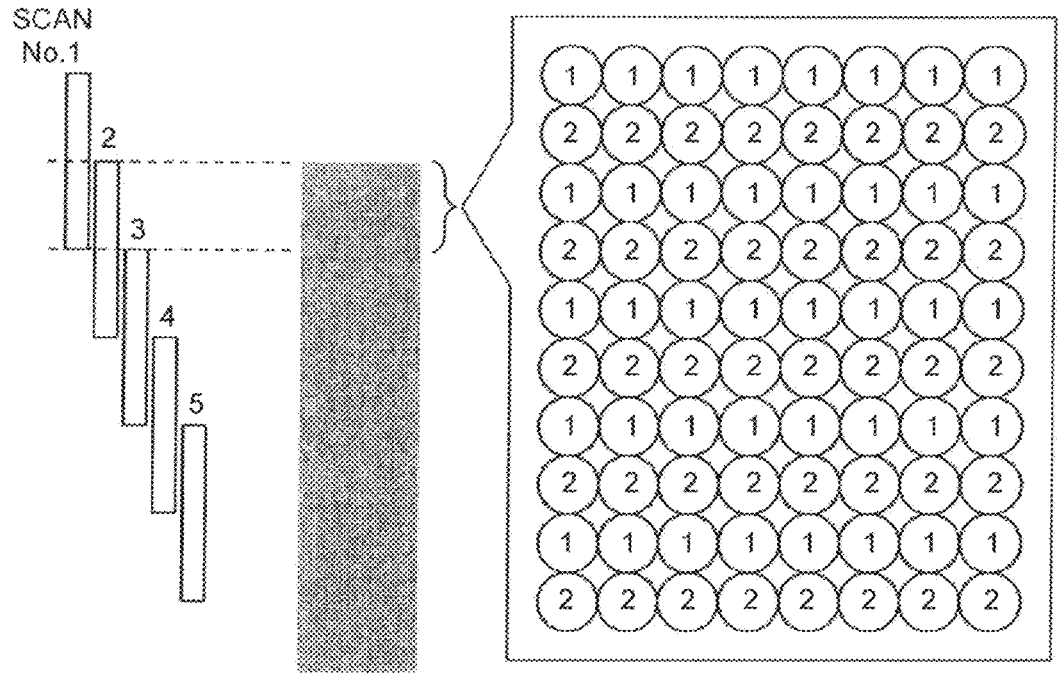
FIG. 21 is a diagram illustrating an example of performing a multi-scan according to an embodiment of the present invention.
FIG. 22 is a diagram illustrating an example of performing a multi-scan according to an embodiment of the present invention.

FIG. 21 illustrates an example of 1-pass ½-interlace as an example of the multi-scan operation. In this case, an image of a portion in which a head of a scan No. 1 overlaps with a head of a scan No. 2 is jointly formed by the scan No. 1 and the scan No. 2, and for a portion of a nozzle undertaking ejection of dots, a nozzle in a lower portion of a head undertakes a first scan, and a nozzle in an upper portion of a head undertakes a second scan.

FIG. 22 illustrates an example of 2-pass ½-interlace. In this case, a dot is jointly formed even in the direction perpendicular to the longitudinal direction of the head, and nozzles undertaking ejection of dots are also two-dimensionally arranged. In this case, since a nozzle undertaking ejection of dots is changed according to a position of image data, it is necessary to reflect a landing model corresponding to a nozzle.

Figure 23:
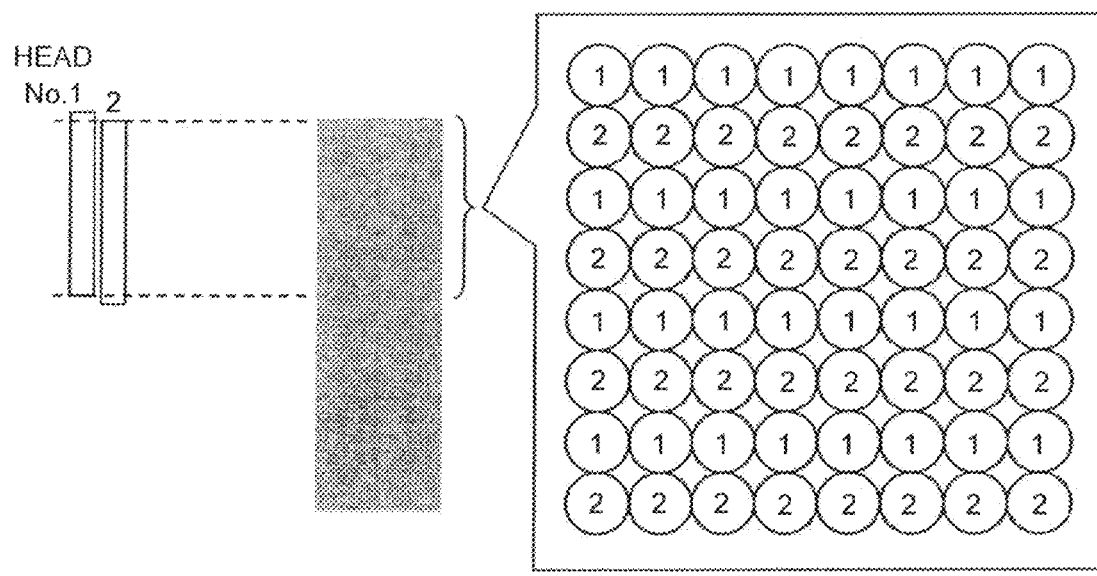
FIG. 23 is a diagram illustrating an example of performing a multi-head operation according to an embodiment of the present invention.
Figure 24:
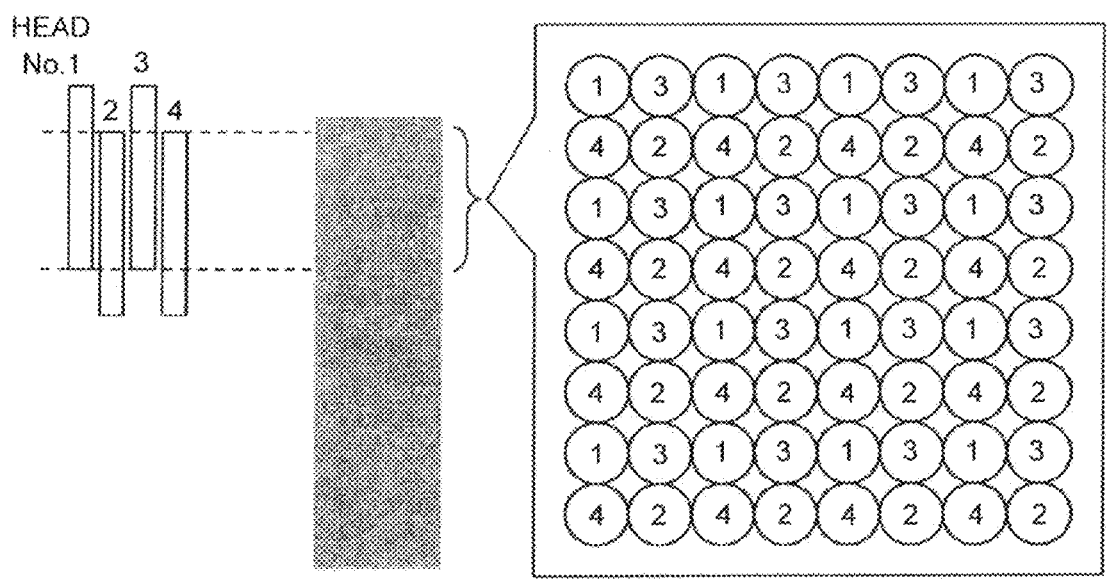
FIG. 24 is a diagram illustrating an example of performing a multi-head operation according to an embodiment of the present invention.

Further, the above-described configuration may be implemented by multiple heads. For example, FIGS. 23 and 24 illustrate examples in which interlace or multi-pass effects are obtained using a plurality of heads, and there are cases in which the multi-scan operation is performed using the head unit having the above configuration. In this case, it is necessary to reflect a landing model of a corresponding nozzle.

Figure 25:
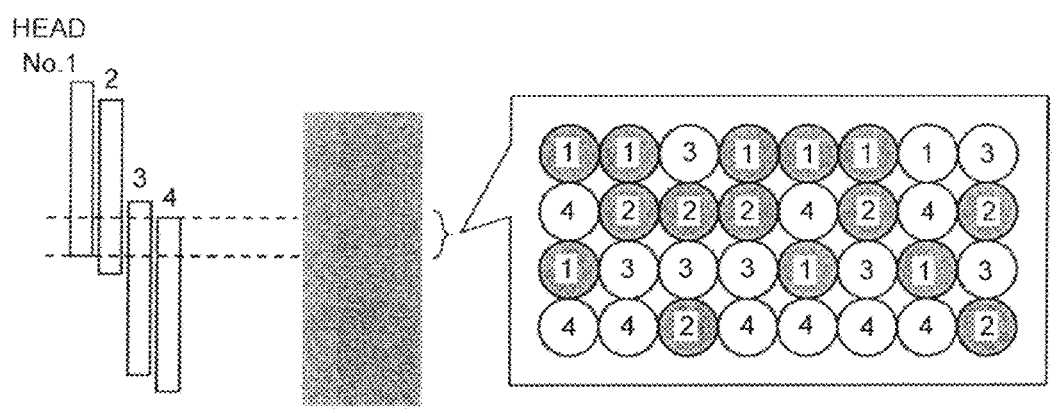
FIG. 25 is a diagram illustrating an example of performing a multi-head operation according to an embodiment of the present invention.

FIG. 25 illustrates an example in which the head assembling is combined with overlapping. In FIG. 25, for an overlapping portion, dots are formed by a combination of heads of head Nos. 1 to 4, but even in this case, it is necessary to correspond a nozzle undertaking ejection and a landing model with each other.

Further, since positional deviation between scans dynamically occurs in multi-scan, it is difficult to predict it, but since a positional relation of nozzles is fixed with respect to a portion in which heads are assembled, when the image patterns illustrated in (b) and (c) of FIG. 10 and FIG. 11 are printed, it is easy to acquire the positional relation and reflect the acquired positional relation in the landing model.

Second Embodiment

The first embodiment has been described with reference to FIG. 15 in connection with the example in which a target image is divided into a plurality of regions, and the process of FIG. 14 is performed for each region to test combinations in which contents of pixels are arranged and decide an arrangement combination having the smallest error. In this case, since an arrangement is decided for each region, compared to the case where combinations in which contents of pixels are arranged are tested on all pixels, the number of dot combinations is small, and thus the calculation amount is suppressed.

On the other hand, the present embodiment will be described in connection with an example in which a target image is divided in units of objects, and the process of FIG. 14 is performed on each object to test combinations in which contents of pixels are arranged and decide an arrangement combination having the smallest error. Here, an object refers to a text, a photograph, a figure, or the like which is included in a target image. In this case, since a dot arrangement is decided for each object, the effects described in the first embodiment are obtained, and continuity in individual objects is not impaired. Hereinafter, an exemplary embodiment of the present invention will be described in detail with reference to the drawings. Here, the same (or corresponding) components as in (or to) the first embodiment are denoted by the same reference numerals, and a detailed description thereof will be omitted.

Figure 26:
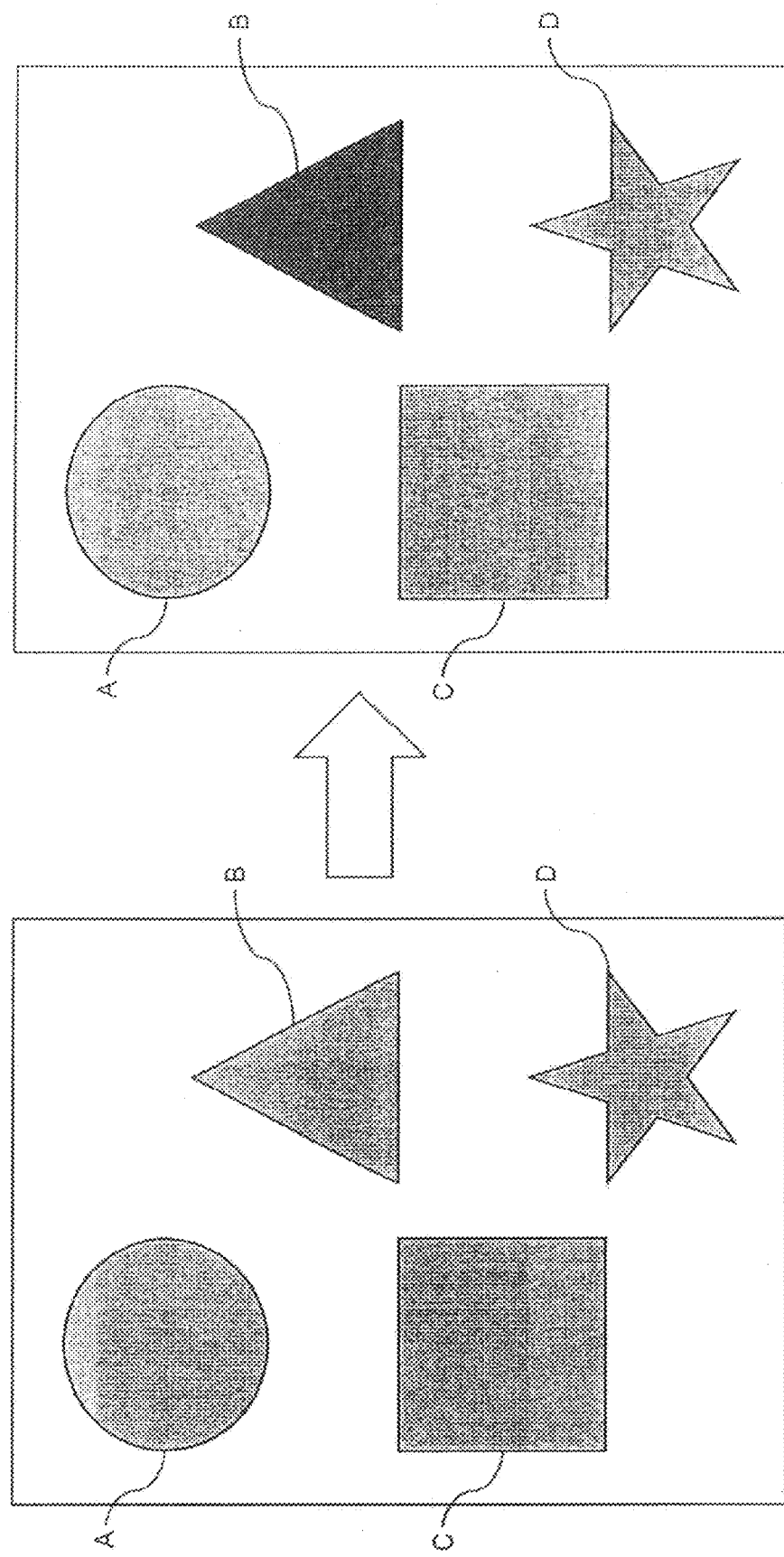
FIG. 26 is a diagram illustrating images before and after a half-toning process is performed according to a related art.

First of all, a concrete example of an effect according to the present embodiment will be described with reference to FIGS. 26 and 27. FIG. 26 is a diagram illustrating images before and after a half-toning process of a related art is performed. FIG. 27 is a diagram illustrating images before and after the half-toning process according to the present embodiment is performed.

When the half-toning process is performed on input multi-valued data illustrated at the left side of FIG. 26, half-toned digital data illustrated at the right side of FIG. 26 is obtained. In this case, a color of an object "B" is changed after the half-toning process. Meanwhile, when the half-toning process is performed on input multi-valued data illustrated at the left side of FIG. 27, half-toned digital data illustrated at the right side of FIG. 27 is obtained. In this case, a color is changed in an object "C" after the half-toning process.

As illustrated in FIG. 26, although a color is changed in units of objects after the half-toning process, since continuity in an individual object is maintained, influence on visibility of the change in the color is considered to be small. However, as illustrated in FIG. 27, when a color is changed in an object after the half-toning process, continuity in an object is impaired, and even when there is a change in a color which is identical in a level to that illustrated in FIG. 26, the change in the color has large influence on visibility. As described above, when continuity in the same object is impaired as the half-toning process is performed, even a slight change has large influence on visibility.

In this regard, in the present embodiment, a target image is divided in units of objects, and the process of FIG. 14 is performed for each object, and thus continuity in an individual object after the half-toning process is secured. Here, in the present embodiment, the rendering information generating unit 112 has a function of dividing a target image in units of objects. In other words, the rendering information generating unit 112 functions as an output image dividing unit.

Here, a certain object includes a large number of pixels. When the process of FIG. 14 is performed on this object, compared to the case where combinations in which contents of pixels are rearranged are tested on all pixels, the number of dot combinations is smaller, and the calculation amount is suppressed, but a huge number of combinations may be obtained.

Figure 28:
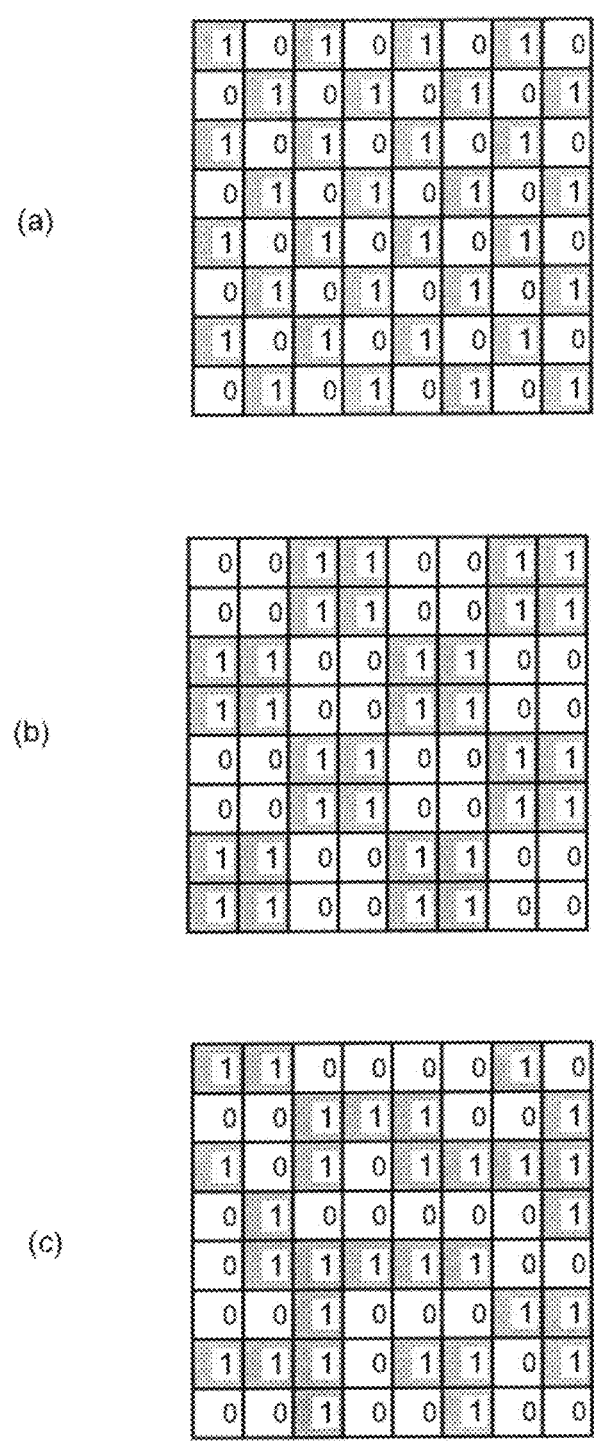
Figure 29:
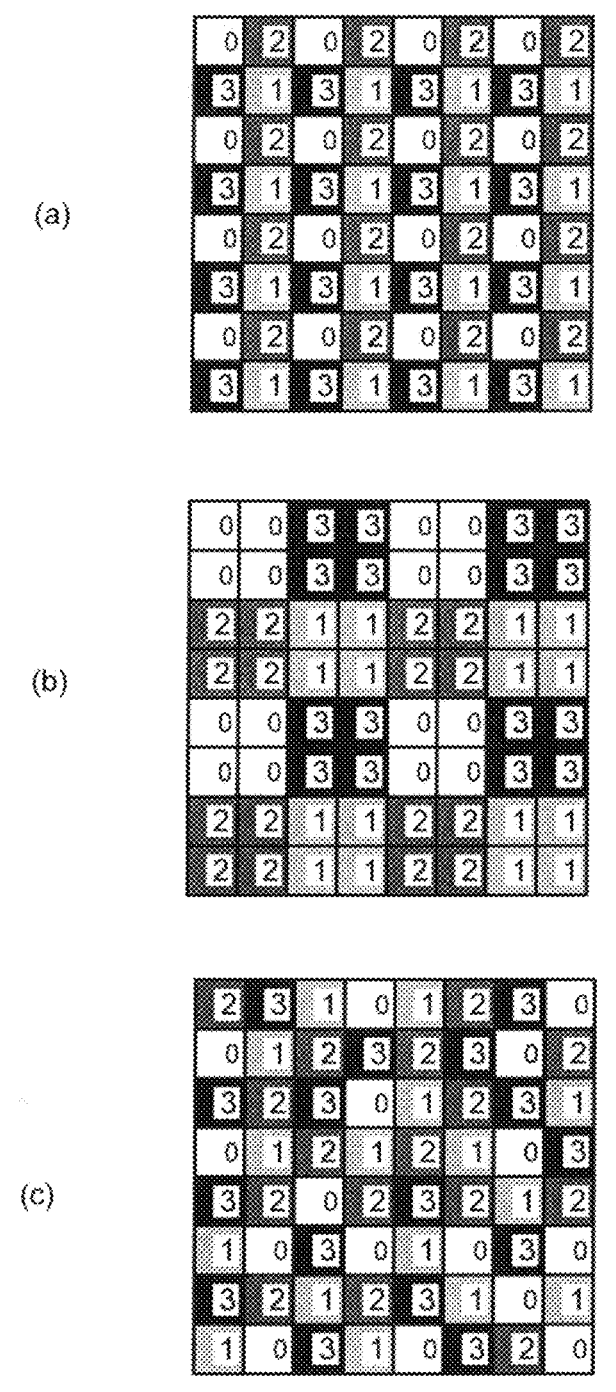

In this regard, next, an example in which the rendering information generating unit 112 further divides each object into a plurality of groups and then performs the process of FIG. 14 on each group will be described with reference to FIGS. 28 and 29. FIGS. 28 and 29 are diagrams illustrating an example in which an object is divided according to the present embodiment. Here, FIGS. 28 and 29 illustrate an example in which the object "C" in FIG. 26 or FIG. 27 is divided.

As an example in which each object is further divided into a plurality of groups as described above, each object may be divided in two groups of a group of "0" and a group of "1" as illustrated in FIG. 28, four groups of a group of "0", a group of "1", a group of "2", and a group of "3" as illustrated in FIG. 29, or more groups.

Further, the number of groups to be divided may be decided according to the number of pixels included in an object. In other words, an object having a small number of pixels is small in the number of dot combinations even without being divided and thus is small in the number of groups to be divided, but an object having a large number of pixels is huge in the number of dot combinations, and thus it is preferable that the number of groups to be divided be large.

Here, a group classification pattern illustrated in FIG. 28 or FIG. 29 may be decided by a normal half-toning process such as an amplitude modulation (AM) screen or a frequency modulation (FM) screen or may be decided randomly. Further, the group classification pattern may be generated in advance or may be generated each time the process of FIG. 14 is performed.

Further, the rendering information generating unit 112 performs the process of FIG. 14 on each group after further dividing an object into a plurality of groups. The process of FIG. 14 may be performed on the respective groups in parallel or may be sequentially performed such that the process is performed on a next group after the process on a certain group ends.

In the former case, it is possible to reduce a processing period of time since the process is performed in parallel, but as described above with reference to (a) FIG. 16, since each dot arrangement has not been decided between adjacent groups, there is no information about the boundary portion, and thus it is difficult to perform accurate simulation. However, it is a phenomenon limited to the case where groups of the same type are adjacent to each other as illustrated in (b) and (c) of FIG. 28 and (b) of FIG. 29, and it is not problematic when groups of the same type are not adjacent to each other as illustrated in (a) of FIG. 28, and (a) and (c) of FIG. 29.

Meanwhile, in the latter case, a processing period of time is hardly reduced, but since a dot arrangement of a previously processed group has been decided, it is possible to select a dot arrangement for a group adjacent to the previously processed group such that landing information of the previously processed group is reflected. However, in this case, since a dot arrangement of a next group is decided in the state in which a dot arrangement of a specific group is decided, a degree of freedom in selecting the dot arrangement of the next group is lower than a previous group, and thus the image quality may deteriorate.

In this regard, in the latter case, it is preferable that the rendering information generating unit 112 decide the dot arrangement of the next group in view of influence on the previously processed group. In other words, when an error is calculated in a group which is being subjected to the process of FIG. 14, the rendering information generating unit 112 calculates an error even in a processed group, and thus it is possible to make up for the difference in the image quality with the previously processed group.

Further, as another method of deciding a group classification pattern, there is a Voronoi tessellation. When the group classification pattern is decided by the Voronoi tessellation, compared to the case where the group classification pattern is decided by the process such as the AM screen or the FM screen illustrated in FIG. 28 or FIG. 29, a group classification pattern is random. For this reason, when the group classification pattern is decided by the Voronoi tessellation, since the decided pattern is not constant in the shape or the size, accurate simulation can be performed even when the process of FIG. 14 is performed on the respective groups in parallel.

Further, as described above, an object is further divided into a plurality of groups, and then the process of FIG. 14 is performed on each group, but when the sequential process is performed such that a next group is processed after processing of a certain group ends, since a dot arrangement of a next group is decided in the state in which a dot arrangement of a specific group is decided, a degree of freedom in selecting the dot arrangement of the next group is lower than a previous group, and thus the image quality may deteriorate.

In this regard, in the process of FIG. 14, the rendering information generating unit 112 can prevent decision of a dot arrangement of a certain group from deteriorating the image quality of other groups by arranging contents of pixels in a certain group, then calculating an error in a plurality of other groups, and repeating this process until the error does not vary or a variation in the error is a certain amount or less.

When the process of FIG. 14 is performed on a certain group, rearrangement of contents of pixels in the corresponding group affects an error in other groups and may work on to increase the error according to circumstances, and thus, in this case, it is effective.

Here, the process of FIG. 14 is performed on each group to test combinations in which contents of pixels are rearranged and decide an arrangement combination having the smallest error, but at this time, all combinations may be tested, or candidates of combinations may be narrowed down and tested. It is desirable to narrow down candidates, for example, using an optimal search technique such as a bifurcation division technique or a simulated annealing technique.

Figure 30:
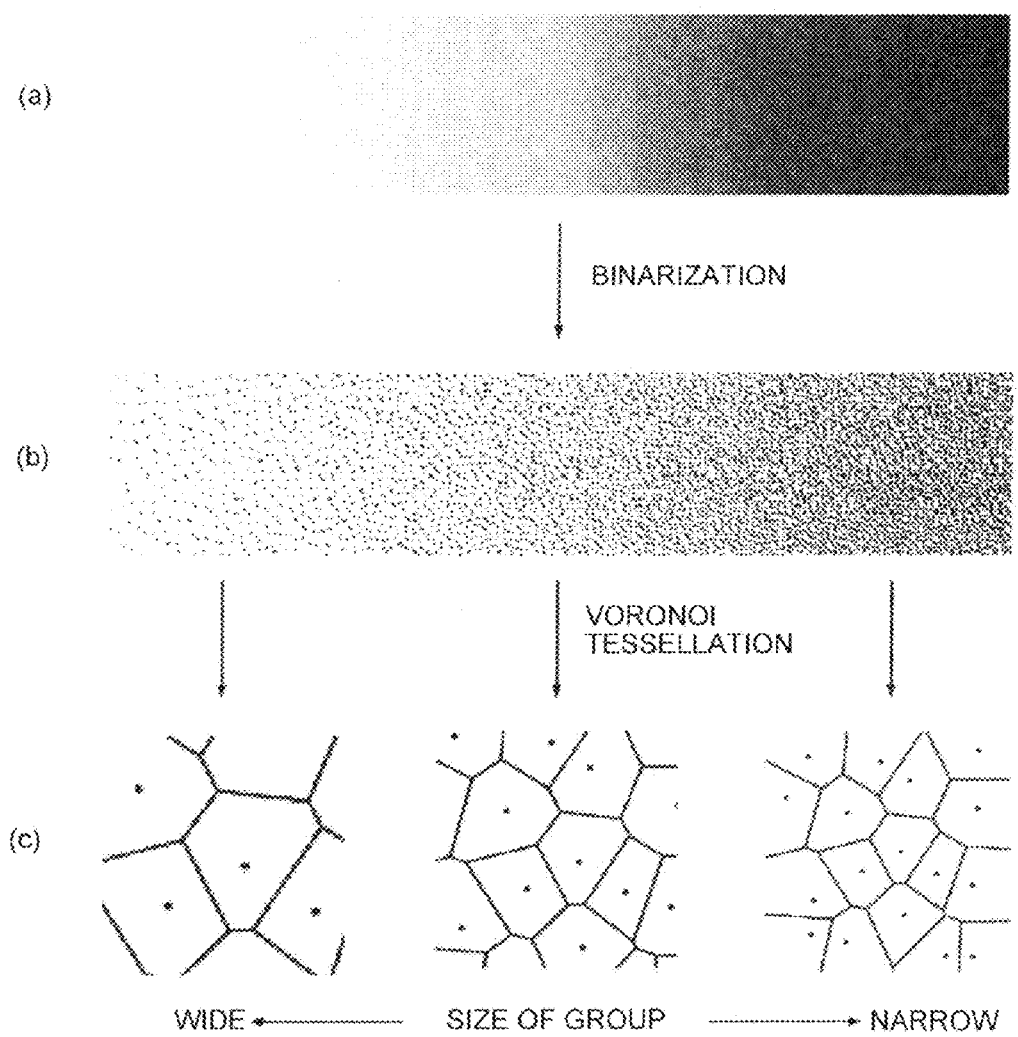
FIG. 30 illustrates an exemplary group classification process of each objet according to an embodiment of the present invention.
Figure 31:
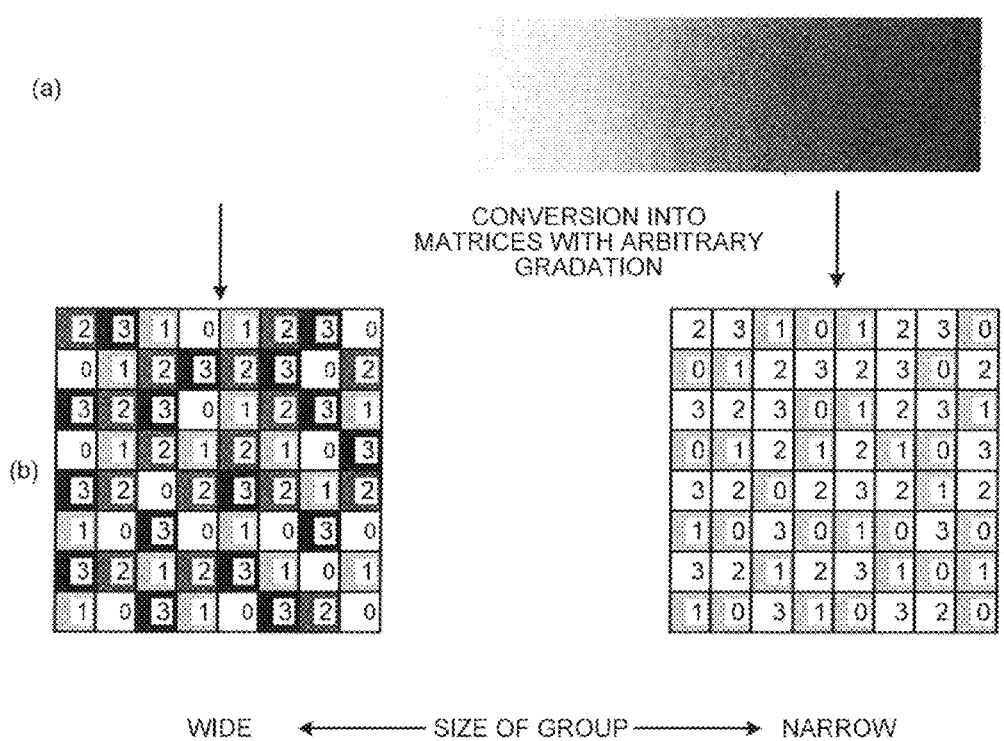
FIG. 31 illustrates an exemplary group classification process of each objet according to an embodiment of the present invention.

Further, the rendering information generating unit 112 may perform a group classification process and a dot arrangement process according to a gradation level since a gradation level continuously changes in each object as illustrated in (a) of FIG. 30 and (a) of FIG. 31. FIGS. 30 and 31 are diagrams illustrating an exemplary group classification process of each object according to the present embodiment.

In this case, since pixels that are high in a gradation level and dark in color are high in the ink-covered amount, a dot arrangement that is not optimal to a group including such pixels is not considered to be noticeable as an image flaw. Further, since pixels that are low in a gradation level and light in color are low in the ink-covered amount, a dot arrangement that is not optimal to a group including such pixels is considered to be noticeable as an image flaw.

In other words, when the process of FIG. 14 is performed on a group including pixels which are high in a gradation level and dark in color, the number of dot combinations to be tested is reduced, and the process of FIG. 14 is stopped even before the smallest error is obtained, and thus more emphasis is placed on a reduction in the calculation amount than the image quality. However, when the process of FIG. 14 is performed on a group including pixels which are low in a gradation level and light in color, combinations in which contents are arranged on all pixels included in the corresponding group are tested, and the process of FIG. 14 is performed until the smallest error is obtained, and thus more emphasis is placed on the image quality more than the reduction in the calculation amount.

As described above, when the dot arrangement process is performed according to the gradation level, the group classification process needs to be performed according to the gradation level as the premise thereof. To this end, the rendering information generating unit 112 performs the half-toning process on an object illustrated in (a) of FIG. 30 as illustrated in (b) of FIG. 30, performs binarization into a black pixel and a white pixel, and performs the Voronoi tessellation using each of black pixels after binarization as a base point. Then, the rendering information generating unit 112 sets each region which has been subjected the Voronoi tessellation as a group as illustrated in (c) of FIG. 30. Thus, the rendering information generating unit 112 can perform group classification according to the gradation level. Here, the rendering information generating unit 112 may perform group classification based on the size of each Voronoi region which has been subjected to the Voronoi tessellation. In other words, the rendering information generating unit 112 classifies regions having approximately the same size into the same group by integrating adjacent Voronoi regions in which an area difference therebetween which is within a certain range.

Further, as another method of performing group classification according to the gradation level through the rendering information generating unit 112, there is a method of converting an object illustrated in (a) of FIG. 31 into matrices with an arbitrary gradation as illustrated in (b) of FIG. 31, dealing a plurality of groups in a region that is high in a gradation level and dark in color as one group as illustrated at the right of (b) of FIG. 31, and dealing respective groups in a region that is low in a gradation level and light in color as different groups as illustrated at the left of (b) of FIG. 31.

FIG. 31 illustrates an example in which the object illustrated in (a) of FIG. 31 is converted into matrices with 4 gradations as illustrated in (b) of FIG. 31, for a region that is high in a gradation level and dark in color, a group of "0" and a group of "1" are dealt as one group, and a group of "2" and a group of "3" are dealt as one group as illustrated at the right of (b) of FIG. 31, whereas for a region that is low in a gradation level and light in color, four groups of "0" to "3" are dealt as different groups as illustrated at the left of (b) of FIG. 31.

Here, the group classification patterns illustrated in FIGS. 30 and 31 may be generated in advance or may be generated each time the process of FIG. 14 is performed.

Further, since the group classification process and the dot arrangement process are performed in units of objects as described above, when a setting is made so that the group classification method is appropriately changed according to characteristics of an object, the optimal half-toning process can be performed on each object.

For example, generally, in case of a text or line-like object, the number of pixels in a corresponding image is small, but the shape of a contour or a contrast of a contour is consequential. In other words, in case of a text or line-like object, the image quality is more important than a reduction in the calculation amount. Thus, in case of a text or line-like object, it is preferable that group classification be not performed so that many dot arrangements can be tried in the process of FIG. 14, or that group classification be performed so that the number of pixels included in each group increases.

Here, in case of a text or line-like object, since the number of pixels in a corresponding image is small as described above, even when the group classification is not performed or when the group classification is performed so that the number of pixels included in each group increases, the calculation amount does not increase.

Further, the above-described process may be performed for each color. Particularly, when the group classification is performed at the same position for each color, group classification boundaries for all colors are concentrated, and continuity in an object is likely to be impaired, and thus it is effective to perform the above-described process for each color.

Further, the above-described process may be performed according to brightness. In this case, since pixels having high brightness are high in the ink-covered amount, a dot arrangement that is not optimal to a group including such pixels is not considered to be noticeable as an image flaw. Further, since pixels having low brightness are low in the ink-covered amount, a dot arrangement that is not optimal to a group including such pixels is considered to be noticeable as an image flaw. This is similarly applied even when colors that have hues of the same type but are different in brightness are used.

In other words, when the process of FIG. 14 is performed on a group including pixels which are high in brightness, the number of dot combinations to be tested is reduced, and the process of FIG. 14 is stopped even before the smallest error is obtained, and thus more emphasis is placed on a reduction in the calculation amount than the image quality. However, when the process of FIG. 14 is performed on a group including pixels which are low in brightness, combinations in which contents are arranged on all pixels included in the corresponding group are tested, and the process of FIG. 14 is performed until the smallest error is obtained, and thus more emphasis is placed on the image quality more than the reduction in the calculation amount.

Further, in recent years, a multi-core micro processing unit (MPU) or a calculation technique such as a multi-core operation process using a graphics processing unit (GPU) makes it possible to perform a parallelization process. Thus, when such techniques are applied to the present embodiment, the processing speed can be improved.

Specifically, the processing speed can be improved such that the process of FIG. 14 is performed simultaneously on a plurality of objects using the above techniques after division is performed in units of objects or the process of FIG. 14 is performed simultaneously on a plurality of groups after group classification is performed on a certain object. Further, as another example using the above techniques, a technique of performing the object division, group classification, or the process of FIG. 14 may be performed on simultaneously a plurality of colors.

Further, since there is a trade-off relation between the image quality and the calculation amount when the process of FIG. 14 is performed, a configuration in which the image quality or the calculation amount can be flexibly set as a target on which emphasis is placed may be provided. Specifically, when emphasis is placed on the image quality, a setting is made so that the number of pixels included in each group increases at the time of group classification, whereas when emphasis is placed on the calculation amount, a setting is made so that the number of pixels included in each group decreases at the time of group classification.

Such a setting may be made by the user's operation, may be given from the printer driver 110 or the application 101, or may be automatically made according to the selected mode when the printing mode is selected in the printer driver 110. Further, the user may operate the operation panel 30 and input such a setting directly to the image forming apparatus 2.

Here, the above-described image processing may be performed by an image processing apparatus forming print image data such as the RIP rather than the image forming apparatus 2, and image data that has been subjected to the above-described image processing may be generated by the RIP. For example, when a configuration capable of causing the image forming apparatus 2 to print a pattern used to acquire a landing model from the RIP, acquiring the landing model through a scan or a sensor, and generating image data in which this information is reflected is given, even when the image forming apparatus 2 does not have the image processing function, it is possible to obtain an output result having an excellent image quality.

According to the present invention, it is possible to perform image forming/outputting according to characteristics of the image forming/outputting engine without deteriorating the image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing method, comprising:
    acquiring a first image on which an image forming/outputting process is to be performed by an image forming apparatus;
    storing the first image in a storage medium;
    dividing the stored first image into a plurality of regions according to content of the first image;

generating a second image with a converted gradation by converting a gradation of pixels of the stored first image into a gradation of pixels expressible in the image forming apparatus for each of the regions;

generating a piece of simulation information of a result of the image forming/outputting process to be performed by the image forming apparatus based on the second image and nozzle characteristic information for each of the regions, the nozzle characteristic information being information representing characteristics of an ink ejecting nozzle of the image forming apparatus and being generated based on dot pattern image information that is information of an image obtained as a result of an image forming/outputting process that has been performed on a certain dot pattern;

storing the piece of simulation information in the storage medium;

calculating an error between the first image and a third image for each of the regions, the third image being obtained by converting the piece of simulation information with the gradation of pixels of the first image;

storing the error in the storage medium; and deciding one of the second images as rendering information used to cause the image forming apparatus to perform an image forming/outputting process, based on the calculated errors between the first image and the third images obtained from the pieces of simulation information that are generated respectively based on the second images that are in different gradation conversion forms for the respective regions.

2. The image processing method according to claim 1, further comprising:

dividing each of the regions into a plurality of small regions according to the number of pixels included in the each of the regions; and deciding the rendering information for each of the small regions.

3. The image processing method according to claim 2, wherein the dividing of each of the regions is performed according to a gradation level of pixels included in the each of the regions.

4. The image processing method according to claim 2, wherein the dividing of the each of the regions is performed according to brightness of pixels included in the each of the regions.

5. The image processing method according to claim 2, further comprising:

generating a fourth image by binarizing each pixel included in the first image; and performing Voronoi tessellation on the fourth image to generate Voronoi regions for each of the divided regions, wherein the dividing of each of the regions includes integrating adjacent regions in which a difference in an area is within a certain range among the Voronoi regions to obtain the respective small regions.

6. The image processing method according to claim 2, wherein the deciding decides the rendering information for each of the small regions in parallel on the small regions which are not adjacent to each other.

7. The image processing method according to claim 2, wherein the deciding decides the rendering information for each of the small regions based on a priority order set to the each of the small regions, and in view of a simulation result of an image with a converted gradation decided as the rendering information on a small region adjacent to a small region having the decided rendering information.

8. The image processing method according to claim 2, wherein the dividing of each of the regions is performed for each of colors of pixels included in the divided region.

9. A non-transitory computer-readable storage medium with an executable program stored thereon, wherein the program instructs a computer to perform:

acquiring a first image on which an image forming/outputting process is to be performed by an image forming apparatus;

storing the first image in a storage medium;

dividing the stored first image into a plurality of regions according to content of the first image;

generating a second image with a converted gradation by converting a gradation of pixels of the stored first image into a gradation of pixels expressible in the image forming apparatus for each of the regions;

generating a piece of simulation information of a result of the image forming/outputting process to be performed by the image forming apparatus based on the second image and nozzle characteristic information for each of the regions, the nozzle characteristic information being information representing characteristics of an ink ejecting nozzle of the image forming apparatus and being generated based on dot pattern image information that is information of an image obtained as a result of an image forming/outputting process that has been performed on a certain dot pattern;

storing the piece of simulation information in the storage medium;

calculating an error between the first image and a third image for each of the regions, the third image being obtained by converting the piece of simulation information with the gradation of pixels of the first image;

storing the error in the storage medium; and deciding one of the second images as rendering information used to cause the image forming apparatus to perform an image forming/outputting process, based on the calculated errors between the first image and the third images obtained from the pieces of simulation information that are generated respectively based on the second images that are in different gradation conversion forms for the respective regions.

10. An image processing apparatus, comprising:

an image acquiring unit configured to
  acquire a first image on which an image forming/outputting process is to be performed by an image forming apparatus, and
  store the first image in a storage medium;

an output image dividing unit configured to divide the stored first image into a plurality of regions according to content of the first image;

a gradation converting unit configured to generate a second image with a converted gradation by converting a gradation of pixels of the stored first image into a gradation of pixels expressible in the image forming apparatus for each of the regions;

an output result simulating unit configured to
  generate a piece of simulation information of a result of the image forming/outputting process to be performed by the image forming apparatus based on the second image and nozzle characteristic information for each of the regions, the nozzle characteristic information being information representing characteristics of an ink ejecting nozzle of the image forming apparatus and being generated based on dot pattern image information that is information of an image obtained as a result of an image forming/outputting process that has been performed on a certain dot pattern, and store the piece of simulation information in the storage medium;

a simulation error calculating unit configured to calculate an error between the first image and a third image for each of the regions, the third image being obtained by converting the piece of simulation information with the gradation of pixels of the first image, and store the error in the storage medium; and a rendering information deciding unit configured to decide one of the second images as rendering information used to cause the image forming apparatus to perform an image forming/outputting process, based on the calculated errors between the first image and the third images obtained from the pieces of simulation information that are generated respectively based on the second images that are in different gradation conversion forms for the respective regions.

* * * * *